(12) United States Patent
Canada et al.

(10) Patent No.: US 6,301,514 B1
(45) Date of Patent: Oct. 9, 2001

(54) METHOD AND APPARATUS FOR CONFIGURING AND SYNCHRONIZING A WIRELESS MACHINE MONITORING AND COMMUNICATION SYSTEM

(75) Inventors: Ronald G. Canada; James C. Robinson; Zbigniew Czyzewski; Taylor L. Davidson, Jr., all of Knoxville; James W. Pearce, Lenoir City, all of TN (US)

(73) Assignee: CSI Technology, Inc., Wilmington, DE (US)

( * ) Notice: Subject to any disclaimer, the term of this patent is extended or adjusted under 35 U.S.C. 154(b) by 0 days.

(21) Appl. No.: 09/073,626

(22) Filed: May 6, 1998

Related U.S. Application Data

(63) Continuation-in-part of application No. 08/835,083, filed on Apr. 4, 1997, now Pat. No. 5,907,491, which is a continuation-in-part of application No. 08/697,372, filed on Aug. 23, 1996, now Pat. No. 5,854,994.

(51) Int. Cl.[7] ....................................................... G06F 11/00
(52) U.S. Cl. ......................... 700/108; 700/109; 700/110; 340/825.06; 340/825.08
(58) Field of Search ..................................... 700/108, 109, 700/110, 174; 702/56; 340/825.06, 825.08

(56) References Cited

U.S. PATENT DOCUMENTS

| | | | |
|---|---|---|---|
| 4,237,454 | 12/1980 | Meyer | 340/682 |
| 4,470,141 | 9/1984 | Takada | 370/104 |
| 4,559,828 | 12/1985 | Liszka | 73/658 |
| 4,720,806 | 1/1988 | Schippers et al. | 364/551 |
| 4,722,226 | 2/1988 | Edmonds | 73/660 |
| 4,744,242 | 5/1988 | Anderson et al. | 73/104 |
| 4,766,432 | 8/1988 | Field | 340/825.17 |
| 4,766,548 | 8/1988 | Cedrone et al. | 364/479 |

(List continued on next page.)

FOREIGN PATENT DOCUMENTS

| | | |
|---|---|---|
| 2197473 | 5/1988 | (GB) . |
| 2271691 | 4/1994 | (GB) . |
| 5-191909 | 7/1993 | (JP) . |

Primary Examiner—Paul P. Gordon
(74) Attorney, Agent, or Firm—Luedeka, Neely & Graham, P.C.

(57) ABSTRACT

A method of configuring and synchronizing a wireless machine monitoring system that has at least one chain, that includes at least one machine monitor and at least one repeater is disclosed. The wireless machine monitoring system may further include a master repeater that is in communication with the chain and a command station that is in communication with the master repeater. The wireless machine monitoring system is configured so that only one element of the system is communicating at any given time. In addition, bit error rate transmission tests are performed on the elements of the system to determine their ability to communicate at different transmission power levels. Thus, power consumption of battery powered elements is minimized by decreasing the amount of time the devices are active and by configuring the communicating elements to transmit at the lowest acceptable power level. An installation and configuration unit is provided for installing and configuring the machine monitors and the repeaters within each chain of the wireless machine monitoring system.

30 Claims, 14 Drawing Sheets

U.S. PATENT DOCUMENTS

| | | | |
|---|---|---|---|
| 4,809,257 | 2/1989 | Gantenbein et al. | 359/136 |
| 4,831,558 | 5/1989 | Shoup et al. | 364/550 |
| 4,831,785 | 5/1989 | Sigg | 51/165 |
| 4,866,422 | 9/1989 | Dunnett et al. | 340/539 |
| 4,885,707 | 12/1989 | Nichol et al. | 364/551.01 |
| 4,887,266 | 12/1989 | Neve et al. | 370/95.1 |
| 5,025,486 | 6/1991 | Klughart | 455/54 |
| 5,046,066 | 9/1991 | Messenger | 370/94 |
| 5,056,235 | 10/1991 | Thomas | 33/503 |
| 5,101,406 | 3/1992 | Messenger | 370/94.1 |
| 5,121,243 | 6/1992 | Miyahira et al. | 359/158 |
| 5,295,154 | 3/1994 | Meier et al. | 375/1 |
| 5,309,351 | 5/1994 | McCain et al. | 364/132 |
| 5,377,922 | 1/1995 | Fredriksson et al. | 242/47.01 |
| 5,384,652 | 1/1995 | Allen et al. | 359/172 |
| 5,400,246 | 3/1995 | Wilson et al. | 364/146 |
| 5,408,506 | 4/1995 | Mincher et al. | 375/356 |
| 5,433,111 | 7/1995 | Hershey et al. | 73/593 |
| 5,438,329 | 8/1995 | Gastouniotis et al. | 340/870.02 |
| 5,444,439 | 8/1995 | Kuroda et al. | 340/825.07 |
| 5,488,631 | 1/1996 | Gold et al. | 375/206 |
| 5,504,746 | 4/1996 | Meier | 370/85.13 |
| 5,528,219 | 6/1996 | Frohlich et al. | 340/540 |
| 5,570,367 | 10/1996 | Ayanoglu et al. | 370/94.1 |
| 5,602,749 | 2/1997 | Vosburgh | 364/474.16 |
| 5,602,757 | 2/1997 | Hasseley et al. | 702/56 |
| 5,608,643 | 3/1997 | Wichter et al. | 364/479.14 |
| 5,854,994 * | 12/1998 | Canada et al. | 702/56 |
| 5,907,491 * | 5/1999 | Canada et al. | 700/108 |

* cited by examiner

METHOD AND APPARATUS FOR CONFIGURING AND SYNCHRONIZING A WIRELESS MACHINE MONITORING AND COMMUNICATION SYSTEM

This is a continuation-in-part of Ser. No. 08/835,083 filed Apr. 4, 1997 now U.S. Pat. No. 5,907,491 issued May 25, 1998, and entitled WIRELESS MACHINE MONITORING AND COMMUNICATION SYSTEM, which is a continuation-in-part of Ser. No. 08/697,372 filed Aug. 23, 1996 now U.S. Pat. No. 5,854,994 issued Dec. 29, 1998, and entitled VIBRATION MONITOR AND TRANSMISSION SYSTEM.

TECHNICAL FIELD

The present invention relates to a method for nonintrusively monitoring one or more physical characteristics associated with a machine. More particularly, the present invention relates to a method for configuring and synchronizing a wireless machine monitoring system for transmitting a wireless signal representing the nonintrusively monitored machine characteristics from at least one sensor to a remote command station.

BACKGROUND

Many manufacturing processes require complex industrial machines utilizing rotating or reciprocating elements. The efficient operation and maintenance of these machines is essential to maximizing production and minimizing downtime. When a rotating machine element acquires a defect, that defect is seldom catastrophic at onset. Instead, the defect is usually of a latent or incipient nature, such as a hairline fracture in the tooth of a gear. Notwithstanding a probable reduction in the efficiency of the machine, if such a fault is not detected, isolated, and repaired, it could grow into a catastrophic failure of the machine with resultant loss of production capacity of the machine and possible injury to personnel. Unfortunately, due to the noise generated by these machines and the acoustic environment in which they normally operate, it is often difficult if not impossible to detect latent or even incipient defects in rotating elements of the machine by visual or aural inspection. Further complicating the detection of such faults is that faulty components may be hidden from view, such as a single gear in an enclosed gearbox.

It is desirable to detect and locate faults while the machine is operating in its normal environment so as not to interfere with the production process. Taking the machine off line to perform preventative maintenance creates an undesirable and inefficient situation, requiring a back-up or redundant machine in order to prevent a shutdown of the production process.

Nonintrusive fault detection may be accomplished by monitoring certain physical characteristics of the machine, such as vibration and temperature levels, using electrical sensors such as accelerometers and temperature sensors. These sensors are typically connected by means of at least one pair of wires per sensor to a monitoring device. The monitoring device processes the sensor signals and produces an output signal which is indicative of the operational health of the machine. Such fault detection devices provide an early indication of machine problems, typically before a catastrophic failure occurs.

One problem associated with wired fault detection systems is the high cost of installation in a typical manufacturing plant. A typical machine may require four to eight vibration sensors mounted at various locations on the machine, and there may be from several dozen to several hundred machines in a typical plant. It is desirable to monitor all of the machines from a central location in the plant, so that manufacturing personnel need not travel to each machine in the plant to assess its health. The installation of wire and conduits to connect each sensor to a central monitoring station could be cost prohibitive.

In addition to installation problems, wired systems are difficult and costly to maintain. Such systems tend to be fragile, primarily due to the wiring. Wires and connectors can easily become contaminated with water or other materials common in dirty industrial environments, resulting in anomalous signals and other failure conditions. Wires are also easily damaged, especially near the connectors, during normal machine maintenance procedures. Such damage is usually manifested as intermittent anomalous signals, which make isolation, diagnosis, and correction of the problem quite difficult.

Wired machine monitoring systems are also inflexible once installed. It is difficult to change the configuration of the system as needs change within the manufacturing plant. If a plant operator decides that more sensors should be added to a machine, or that the location of the machine or sensors should be changed, the cost and difficulties associated with installing additional wiring and conduits must be endured.

Since the major problems associated with wired machine monitoring systems are caused by the presence of the wires, a need exists for a wireless machine monitoring system.

While a number of problems are solved by providing a wireless machine monitoring system, new complexities are introduced as compared to wired systems particularly with regard to the relative positioning and set up of sensors and repeaters. It has been found that the higher the complexity of installation, the greater the chance for error in the installation. Moreover, a high complexity of installation typically results in a large amount of battery life being used during the installation period. Because relatively long battery life is essential for proper operation of the individual components of a wireless system, consuming large amounts of battery life during installation is unacceptable.

Therefore, a need exists for a wireless machine monitoring system that is simple to install and uses very little battery life of the individual components of the wireless machine monitoring system.

SUMMARY

The present invention provides a method for configuring a wireless machine monitoring system that has at least one chain of programmable transceiver devices including a machine monitor, a relay repeater, and an Installation and Configuration Unit ("ICU"). In one embodiment, the method of configuring includes the steps of positioning the ICU in a physical location within wireless communications range of a first transceiver device and receiving data transmitted by the first transceiver device with the ICU. A bit error rate ("BER") calculation is performed on the data transmitted from the machine monitor to the ICU and a BER is determined. The BER is compared to an acceptable BER to determine whether the BER is acceptable. A second transceiver device is mounted where the ICU is positioned if it is determined that the BER is acceptable.

In a preferred method, the ICU is repositioned if it is determined that the ICU is positioned such that either the BER or the physical location is unacceptable for wireless communications between the machine monitor and the relay repeater.

In another preferred method, a minimum transmit power level for the first transceiver device is determined that results in a BER equal to or less than the acceptable BER for data transmitted from the first transceiver device and received by the second transceiver device. The first transceiver device is configured to communicate at the minimum transmit power level.

In another preferred method, the ICU prompts the repeater to send a transmission strength test signal (which includes different power levels) from the repeater to the machine monitor. This transmission strength test signal is monitored by the machine monitor to determine the BER at different transmit power levels. The ICU also prompts the machine monitor to send a transmission strength test signal to the relay repeater to determine the BER at different transmit power levels. A transmission strength configuration signal is sent from the ICU to the machine monitor and the relay repeater corresponding to the minimum transmit power level for the machine monitor and the relay repeater at the acceptable BER.

The preferred method of the present invention further includes the steps of prompting by the ICU for recordation of the serial numbers of the machine monitor and the relay repeater by an operator of the ICU, prompting by the ICU for the operator to input the logical locations of the machine monitor and the relay repeater within the chain, and prompting by the ICU for recordation of physical locations of the machine monitor and the relay repeater on an industrial setting drawing. The preferred method also includes the step of downloading configuration parameters to the machine monitor and the relay repeater from the ICU. A step is further included of placing the machine monitor in a low power consumption mode once wireless communication is established between the machine monitor and the relay repeater. Many of the above steps are repeated for each additional machine monitor in each chain and for each additional relay repeater in each chain.

A second minimum transmit power level can be determined for the second transceiver device for data transmitted from the second to the first transceiver device. The second transceiver device is then configured to communicate at the second minimum transmit power level. The ICU is then positioned in a second physical location within wireless communication range of the second transceiver device and receives data transmitted by the second transceiver device. A BER calculation is performed on the data transmitted from the second transceiver device to the ICU to thereby determine a test BER. The test BER is compared to an acceptable BER to determine whether the test BER is acceptable. A third transceiver device is mounted at the second physical location if it is determined that the BER is acceptable. A third minimum transmit power level is determined for the third transceiver device that results in a BER equal to or less than the acceptable BER for data transmitted from the third transceiver device to the second transceiver device. The third transceiver device is configured to communicate at the third minimum transceiver power level. A fourth minimum transmission power level is determined for the second transceiver device that results in a BER equal to or less than the acceptable BER for data transmitted from the second transceiver device to the third transceiver device. The second transceiver device is configured to communicate at a power level based in part on the second and fourth minimum power levels. Alternatively, the second transceiver device can be configured to communicate at the greater of the second and fourth minimum power levels, or it can be configured to transmit at the second minimum power level when communicating with the first transceiver device and to transmit at the fourth minimum power level when communicating with the third transceiver device.

Another preferred method provides for configuring a wireless machine monitoring system that has at least one chain of programmable transceiver devices including a machine monitor and a relay repeater. The system further includes a master repeater in communication with the at least one chain, a command station in communication with the master repeater, an ICU, and a clock in each transceiver device. The method includes the step of synchronizing the clock of the ICU with the clock of a first transceiver device. Wireless ICU transmit and receive communication is established with the first transceiver device. A permanent time slot is determined under which the first transceiver will communicate. Commands are communicated from the ICU to a second transceiver device and thereby the second transceiver device is configured to communicate with the first transceiver device during the permanent time slot and the clocks of the first and second transceiver devices are synchronized. The ICU requests registration of the second transceiver device by the first transceiver device whereby the first transceiver device is programmed to communicate with the second transceiver device during the permanent time slot. The ICU requests operator validation of the permanent time slot for the second transceiver device.

In a particularly preferred embodiment, the method discussed above is followed with a master repeater used as the first transceiver device and a first relay repeater used as the second transceiver device. The method is also repeated with the first and second relay repeaters used as the first and second transceiver devices. Finally, the method is repeated with the machine monitors used as the second transceiver device and the second relay repeaters used as the first transceiver device.

A particularly preferred method of practicing the present invention includes configuring and synchronizing a wireless machine monitoring system having at least one chain including a machine monitor and a relay repeater, a master repeater in communication with the at least one chain, a command station in communication with the master repeater, and an ICU. A clock is contained in each machine monitor, relay repeater, master repeater and ICU. The wireless machine monitoring system is configured by downloading configuration parameters to the machine monitor and the relay repeater from the ICU. The ICU is positioned within wireless communications range of the machine monitor and wireless communication is established between the ICU and the machine monitor. An acceptable BER is determined for communications between the machine monitor and the relay repeater. A BER calculation is performed on data transmitted by the machine monitor to the ICU. From the BER, it is determined whether the ICU is positioned such that the BER is acceptable for wireless communications between the machine monitor and the relay repeater. If it is determined that the BER is unacceptable for wireless communications between the machine monitor and the relay repeater, the ICU is repositioned within wireless communications range of the machine monitor and the BER test is repeated. The relay repeater is positioned where the ICU is located if it is determined that the BER is acceptable for wireless communications between the machine monitor and the relay repeater. Configuration parameters are downloaded to the relay repeater. A minimum transmit power level for the machine monitor is determined based on the acceptable BER. A transmission strength signal configuration message is sent from the ICU to the machine monitor and the machine monitor is thereby configured to transmit at the minimum transmit power level for the machine monitor. The ICU prompts the user to record the serial numbers for the machine monitor and the relay repeater, and the logical locations of the machine monitor and the relay repeater in the chain. The ICU also prompts the user to record the physical locations of the machine monitor and the relay repeater. The wireless machine monitoring system is synchronized by synchronizing the clocks of the machine monitors, the relay repeaters, and the ICU. Wireless ICU transmit and receive communication is established with the relay repeater. The ICU transmits signals requesting registration by the relay repeater of the machine monitor. A permanent time slot is selected under which the relay repeater communicates with the machine monitor. Operator validation of the permanent time slot under which the relay repeater and machine monitor are operational is requested. The ICU transmits to the relay repeater and the machine monitor a configuration signal and thereby configures the relay repeater and machine monitor to operate during the selected permanent time slot.

A number of the above steps are repeated during installation by substituting the master repeater with the relay repeater and the relay repeater with another relay repeater in closer proximity to the machine monitors in the chain. The steps may also be repeated while substituting the master repeater with the other relay repeater and the relay repeater in closest proximity to the machine monitors with a machine monitor. Furthermore, steps that involve a machine monitor are repeated for each similarly situated machine monitor in each chain of the wireless machine monitor system.

Yet another embodiment of the present invention is directed toward a method of installing a wireless machine monitoring system having at least a machine monitor and a command station. The method includes prompting the machine monitor to transmit a known set of data to the command station at a transmission power level, receiving the data at the command station, determining the accuracy with which the machine monitor transmitted the data and adjusting the transmission power level of the machine monitor in response to the accuracy.

The present invention further includes a method of minimizing the power usage of wireless machine monitors that are in communication with a command station. In accordance with the method, the machine monitors are configured to transmit data at the lowest possible power level that allows for reasonably accurate data transmission and to only transmit or receive data intermittently.

The present invention also includes an ICU for installing and configuring a wireless machine monitoring system. The ICU has a transmitter for sending configuration parameters to the machine monitoring system. A receiver receives data from the machine monitoring system. Processing means analyze and store the data received from the machine monitoring system. The processing means may also determine a signal strength of a transmitted signal, assign a machine monitor to a repeater, place a machine monitor or a repeater in a configuration mode, and assign a machine monitor a time slice during which to communicate. Clock means synchronize the operation of the machine monitoring system. The ICU has a display for displaying status information and a keyboard for allowing the user to input information.

BRIEF DESCRIPTION OF THE DRAWINGS

A preferred embodiment of the invention will now be described in further detail. Other features, aspects, and advantages of the present invention will become better understood with regard to the following description, appended claims, and accompanying drawings where:

DETAILED DESCRIPTION OF PREFERRED EMBODIMENTS

Figure 1:
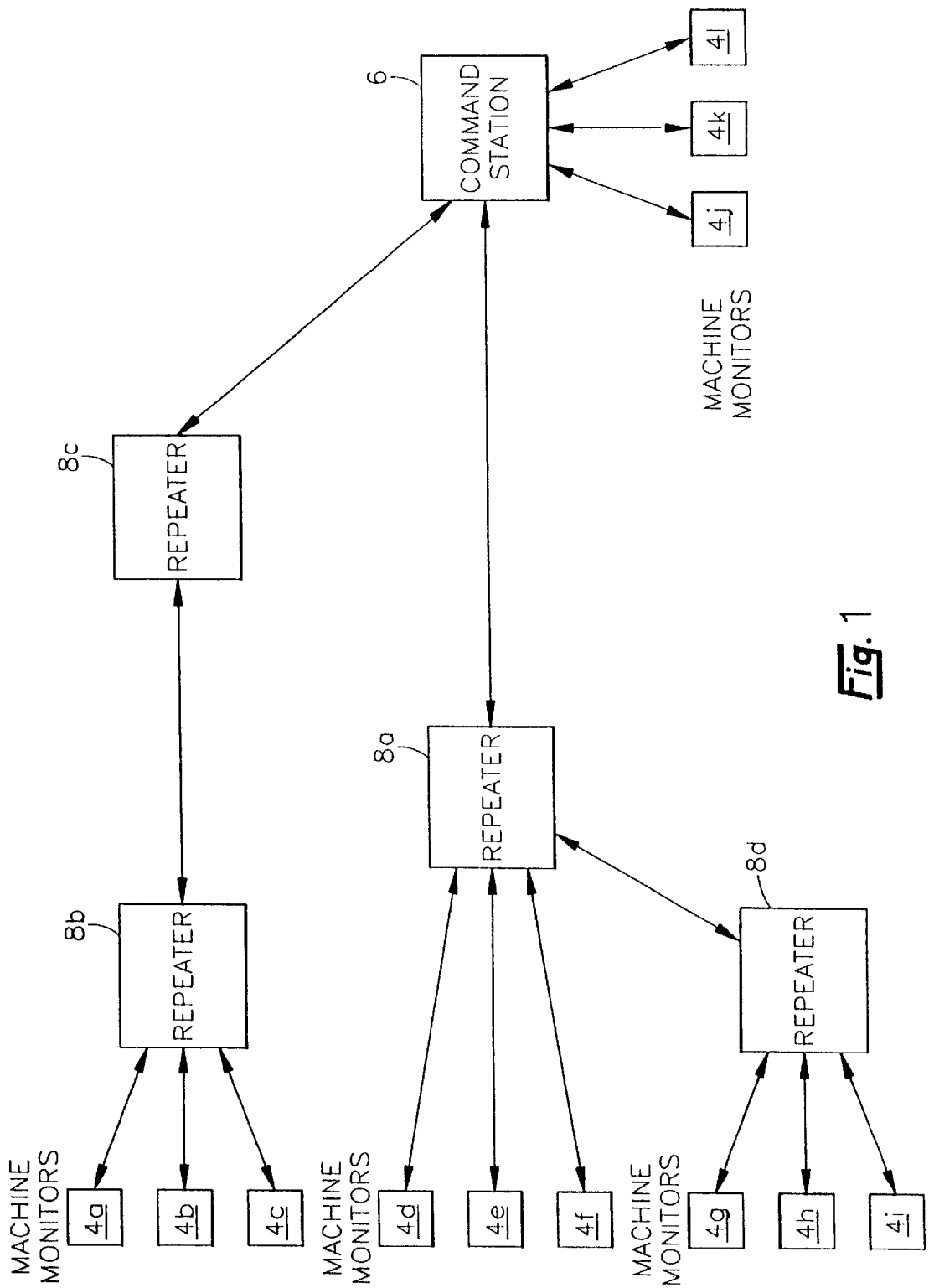
FIG. 1 shows a block diagram of a preferred embodiment of the invention.

In accordance with a preferred embodiment of the present invention, a block diagram of a wireless monitoring system is shown in FIG. 1. The system shown in FIG. 1 is used when it is desirable to remotely monitor certain machine characteristics, but it is undesirable to install wiring between a monitoring station and a sensor on the machine. More specifically, the system is employed to monitor physical characteristics, such as speed, vibration, flux or other electromagnetic characteristics, temperature, and pressure, of machines and processes, such as those in a manufacturing plant. The basic components of the system include: (1) one or more machine monitors 4 which are placed in various locations on, or in, one or more machines and which transmit wireless signals containing status data representative of the status of the machine and the status of the monitor, the machine status data being representative of machine characteristics such as vibration, electromagnetic energy, and temperature, the monitor status data being representative of monitor characteristics such as the condition of the monitor's battery, circuitry, and sensors; (2) a command station 6 which transmits commands and information to the machine monitors 4, receives data transmitted from the machine monitors 4, and formats the data as desired by an operator; and (3) one or more repeaters 8 as needed to facilitate communication between the machine monitors 4 and the command station 6, especially when site conditions make such aid necessary.

The basic components of the system may be configured in various ways, some of which are illustrated in FIG. 1, to meet the requirements of the particular location where the system is used. If a particular machine is located such that machine monitors 4 placed on the machine are beyond the receiving range of the command station 6, or are out of the line of sight to the command station 6, a properly located repeater 8 is used to receive the signals from the machine monitors 4 and retransmit the signals to the command station 6. In some situations, more than one repeater 8 is necessary to provide for communication between the machine monitors 4 and the command station 6. In other situations, direct communication between the command station 6 and the machine monitors 4 is possible without the use of a repeater 8.

Figure 2:
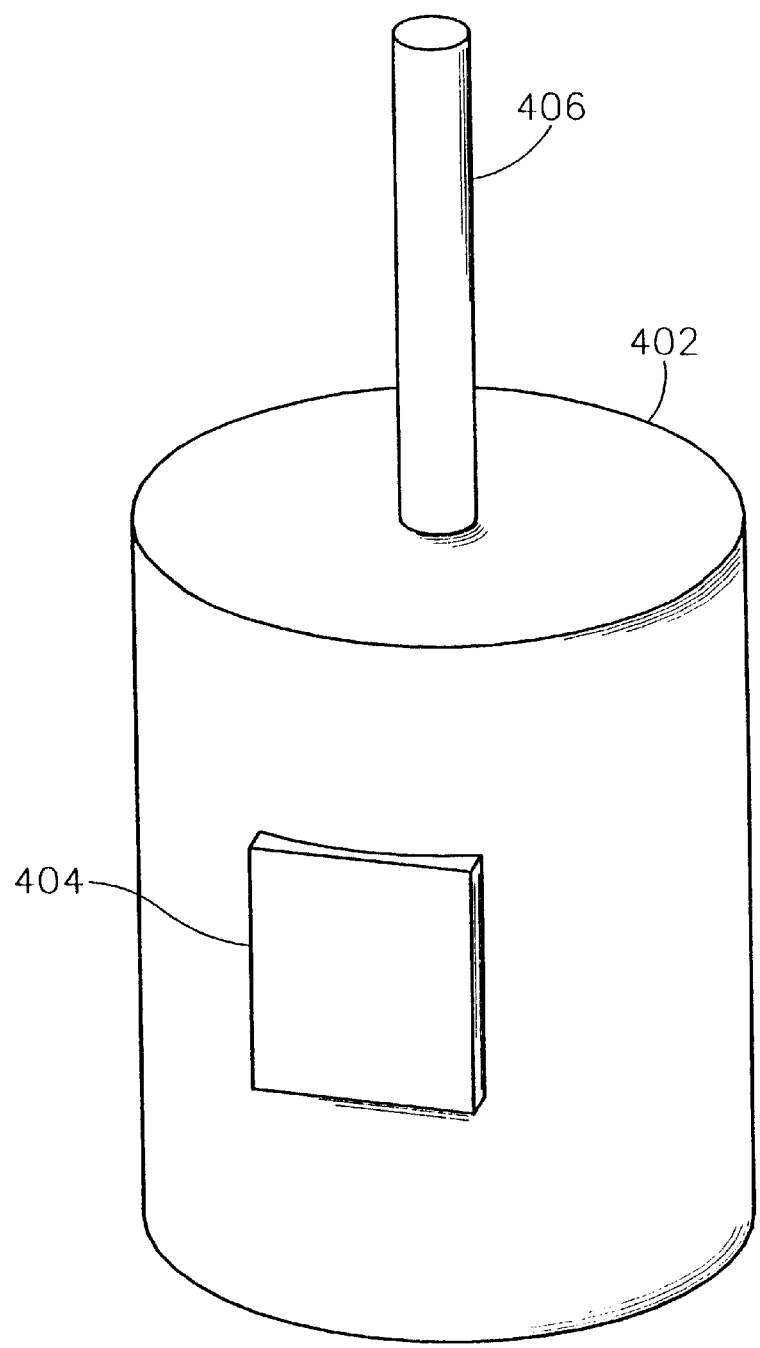
FIG. 2 is a drawing of the machine monitor element of a preferred embodiment of the invention.

As shown in FIG. 2, the machine monitor 4 of FIG. 1 is contained in a compact housing 402, such as a two-inch diameter by three-inch long cylinder with self-contained attachment means 404, such as a magnetic mount, so that the monitor may be easily attached to the machine even in cramped locations. As shown in FIG. 2, an antenna 406 is preferably integrated with the housing 402.

Figure 3:
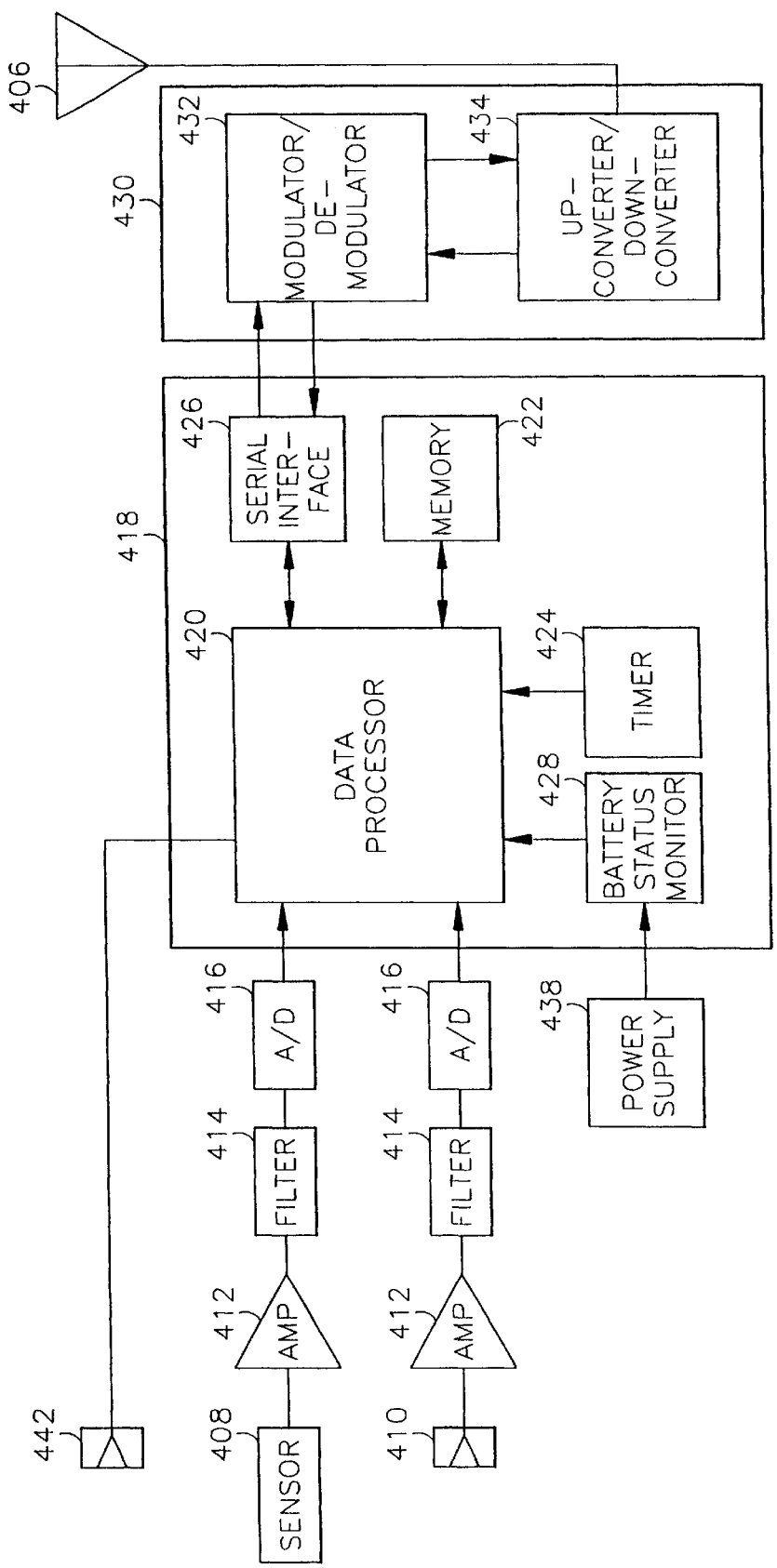
FIG. 3 shows a block diagram of the machine monitor element of a preferred embodiment of the invention.

In FIG. 3, a functional block diagram of the machine monitor 4 of FIG. 1 is shown. Each machine monitor 4 contains at least one sensor 408 which is integrated with the machine monitor housing in such a manner that the desired machine characteristic is accurately measured when the machine monitor housing is fastened to the machine. Preferably, there are a plurality of sensors 408, such as a flux sensor, two temperature sensors, an RF sensor, and two vibration sensors. The machine monitor 4 has connectors 410 so that one or more sensors 408 may be interfaced with the data processing and transmission circuitry of the machine monitor 4. In this manner, the characteristics of interest may be measured at several locations on the machine and then transmitted from only one machine monitor 4. The integrated and remote sensors 408 are devices such as small, low-power, low-cost accelerometers, and instantaneous turn-on solid-state temperature sensors. The accelerometers, such as the type number 353B18, have an accuracy of ±5% from 1 to 10000 Hz and ±3 dB up to 30 kHz, and a turn-on settling time of less than five seconds. The temperature sensors, such as the type number LM60, have an accuracy of ±2° C. over a 0 to 80° C. temperature range.

The sensor signals are amplified by an amplifier 412, such as a digitally-controlled variable gain amplifier incorporating a chip of type number LM6684. The sensor signals are filtered to eliminate aliasing by means of an anti-aliasing filter 414, such as a simple resistorcapacitor (RC) low-pass filter or a two-pole Sallen-Key active filter, and are then converted into digital format by an analog-to-digital converter 416, such as a 16-bit Sigma-Delta converter of type number CS5330.

The digital sensor signals are fed to a monitor computer 418, such as the Toshiba TMP93CM41 microcomputer. Examples of circuits incorporating this microcomputer are detailed in the Toshiba 16-Bit Microcontroller TLCS-900/L MCU Series (2) Data Book (March 1995). The monitor computer 418 includes a data processor 420 which performs 16-bit operations with 32-bit extended registers. The monitor computer 418 also incorporates a memory 422 consisting of at least 32 kilobytes of static RAM, a timer 424, a serial interface 426, and a battery status monitor circuit 428. The monitor 4 also includes an internal self-test capability for the electronics and sensors to determine the monitor's own status, which can be transmitted by the monitor 4 to the command station 6 as status data.

With continued reference to FIG. 3, a power supply 438, such as a replaceable "D-cell" flashlight battery provides the electrical power necessary for the functioning of the active elements of the machine monitor 4. Under normal operational conditions, such a battery will provide power for the machine monitor 4 for at least one year. The power supply 438 may alternatively consist of a rechargeable battery, such as a nickel-cadmium cell, and a charging voltage source, such as a solar cell or a wire coil moving across a magnetic field produced by the machine on which the machine monitor 4 is attached. The battery voltage is monitored by a battery status monitor circuit 428 which provides a battery status message to the monitor computer 418. The monitor computer 418 is programmed to transmit this battery status message to the command station 6 as status data, and to transmit a battery status alert message when the battery voltage falls below a programmed threshold level.

While battery power conservation is an important consideration in a wireless monitoring system, it is anticipated that advances in power source technology could reduce or eliminate the importance of power conservation.

In a preferred embodiment, the sensors 408 are not continuously on, but are turned on by the monitor 4 at intervals which have been programmed into the monitor computer 418. The duration of the measurement interval, during which the sensors 408 are on, is preferably about three seconds, just long enough for the sensors 408 to settle and take a measurement. The frequency of the measurement interval is selectable by the operator and can vary substantially depending on needs, including the need to conserve battery power.

To conserve power and extend battery life, the monitor computer 418 remains in a standby mode for a majority of the time in the preferred embodiment, requiring less than 100 $\mu$A of current, and becomes active only at scheduled times as determined by an established communication protocol. For example, in accordance with a preferred time-division communication protocol, the timer 424, which is the monitor computer's only active component while in standby mode, causes the data processor 420 to enter an operational mode and begin processing data from the sensors 408 at scheduled times. The data processing tasks include such functions as (1) production of time wave form vibration data corresponding to the sensor signals (which may include selectable peak hold vibration signal processing with associated peak hold circuitry 417 similar to that disclosed in co-pending U.S. application Ser. No. 08/555, 296, filed Nov. 11, 1995, the entire contents of which is expressly incorporated herein by reference), (2) calculation of fast Fourier transforms (FFT's) on the time-domain sensor data to produce frequency-domain data, (3) comparison of the analyzed sensor data to preprogrammed threshold criteria, (4) production of an alarm message if the threshold criteria is met, (5) band-pass filtering similar to that disclosed in co-pending U.S. application Ser. No. 08/355,208, filed Dec. 9, 1994, the entire contents of which is expressly incorporated herein by reference, and (6) zoom processing similar to that disclosed in the above-referenced co-pending U.S. application Ser. No. 08/355,208. Depending on its programmable instructions, the data processor 420 either sends the processed data over the serial interface 426 to be immediately transmitted, or stores the data in memory 422 for transmission at a later time.

In a preferred embodiment, machines are fitted with tachometer sensors 5a–c. A tachometer 5a–c is preferably grouped with other monitors 4 which are attached to the same machine and which are slaved to the same repeater 8, as illustrated in FIG. 1. The tachometers 5a–c function to assist vibration sensors 408 associated with the monitors 4 by measuring machine RPM and providing RPM data to the monitors 4 so that vibration measurements can be correlated with "current" RPM.

At least two types of tachometers 5a–c may be employed. One type of tachometer 5a–c senses whether the machine is running. If the tachometer data indicates that the machine is off, then all monitors 4 associated with that machine conserve battery power by not taking sensor measurements, such as vibration measurements. The tachometer 5a–c includes an RPM value in its status response to the repeater 8, and the repeater 8 includes the reported RPM in its status poll message to all vibration sensors and monitors 4 which need it. Another type of tachometer 5a–c transmits a tachometer pulse indicating the start of each revolution of the machine. This tachometer pulse is immediately relayed to the vibration sensors and monitors 4 by way of the repeater 8.

In a preferred embodiment, a communication protocol (hereinafter referred to as a time-division communication protocol) is employed for conducting a periodic (preferably once every 60 seconds) status poll of the monitors 4. The protocol involves the use of a time slice schedule or status poll, such as the time slice schedule 18 shown in FIG. 9, where each repeater 8, monitor 4, and sensor, such as a tachometer 5, is allowed to transmit and in some cases receive in a manner that reduces or eliminates the likelihood of interference from two or more devices transmitting at the same time. During each status poll, all devices are resynchronized.

Figure 8:
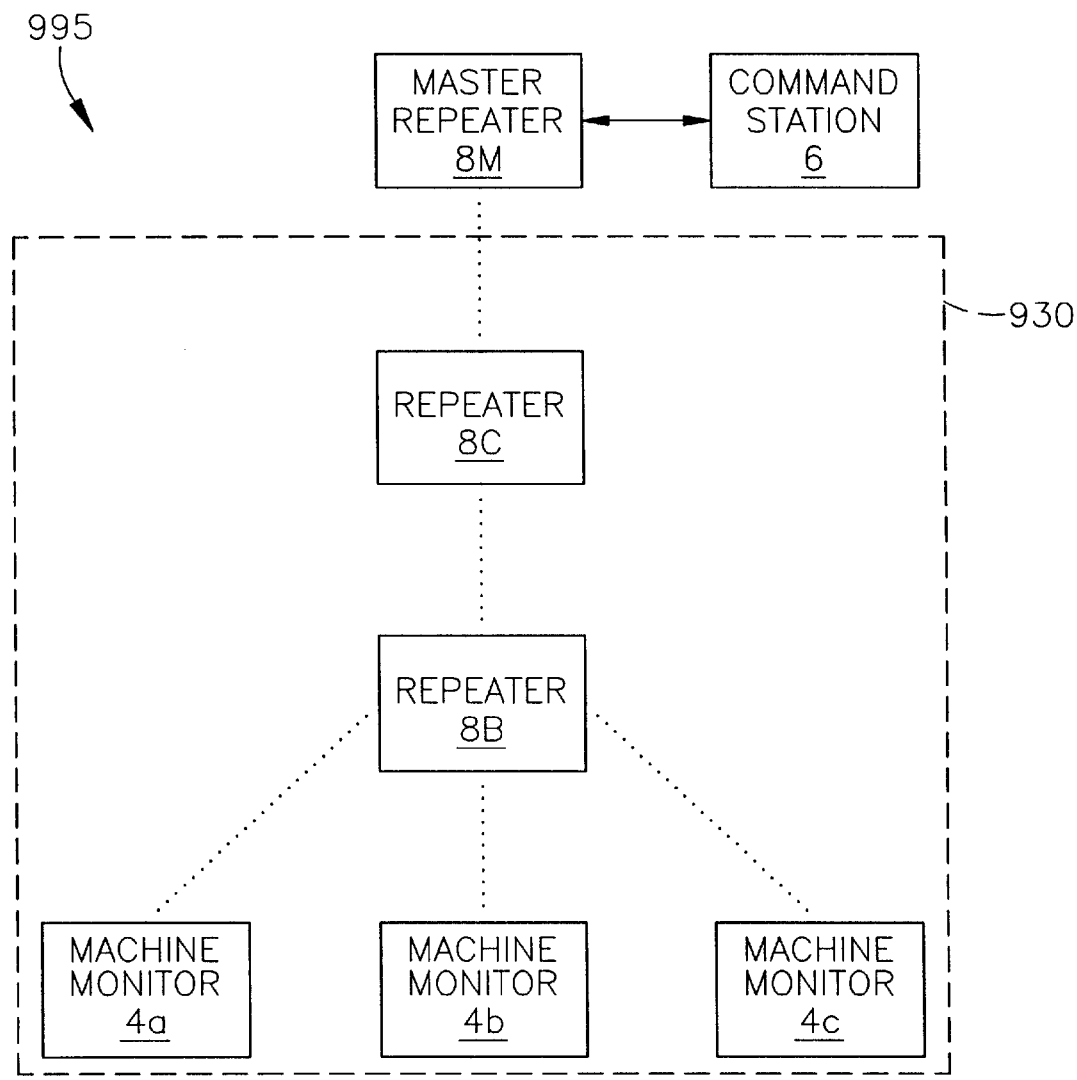
FIG. 8 is functional block diagram of the system of FIG. 1 that illustrates the basic communication signal flow when a time-division communication protocol is employed.
Figure 9:
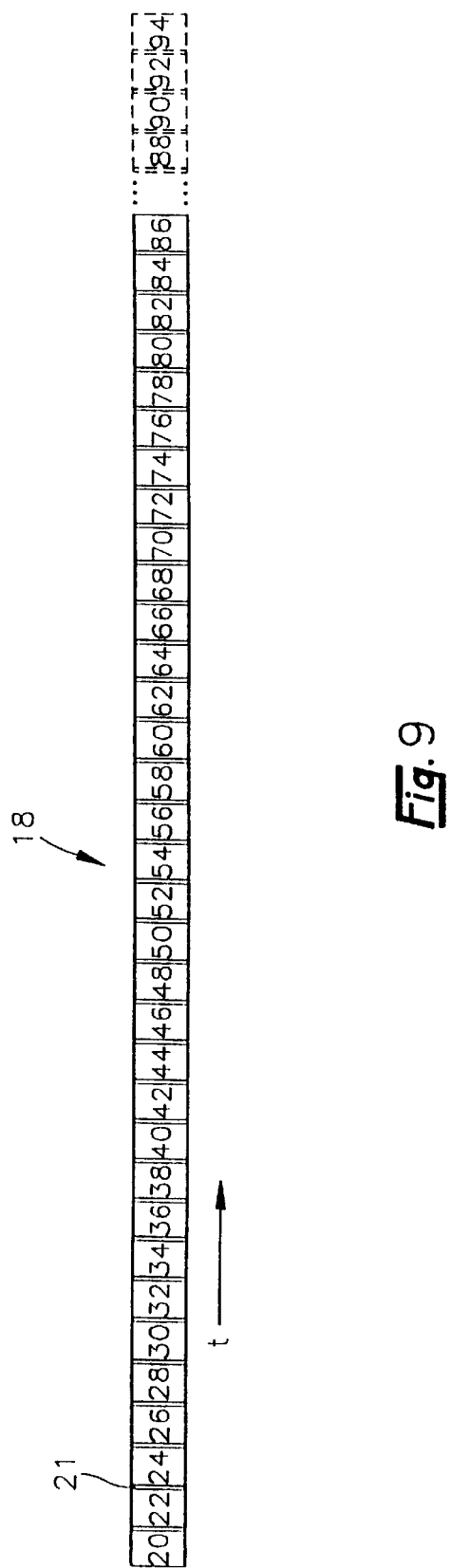
FIG. 9 is a time-division schedule for the time-division communication protocol illustrated in FIG. 8.

FIG. 8 illustrates a typical preferred time-division communication protocol for the system of FIG. 1 (excluding tachometers 5a–c) in accordance with the time slice schedule 18 shown in FIG. 9. During the first time slice 22, the command station 6 transmits a status request to monitor 41, and monitor 41 responds by transmitting the requested status information to the command station 6 during time slice 24. Preferably, the status request transmitted by the command station 6 will include instructions for which data and which functions the monitor 41 is to perform. Alternatively, the desired data and functions are programmed into the monitor 41 and the status request is simply a request for the monitor 41 to perform functions and transmit data in accordance with its programming. The command and response are transmitted by the command station 6 and monitor 41 a few times to ensure proper transmission and receipt. A small amount of dead time 21 is scheduled between transmission of the command during time slice 22 and transmission of the response during time slice 24 to ensure that the command station 6 and monitor 41 do not transmit at the same time. The quantity of data transmitted (i.e., vibration, temperature, spectral, or other) by the monitor 41 during status polling is preferably kept to a minimum to reduce the length of time required to complete the time slice schedule 18. Following receipt of the response during time slice 24, the command station 6 next addresses monitor 4k and requests its status. The response from monitor 4k is transmitted and received during time slice 26. In similar fashion, each monitor 4 in the system is sequentially requested to provide a status to the command station 6 in accordance with the prearranged time slice schedule 18.

Special requests for data sensing, data analysis, data transmission, and data storage can also be transmitted by the command station 6 to one or more monitors 4. Such special requests are additional to the data and functions provided by monitors 4 during normal status polling. For example, if a particular machine is suspected of having an anomalous condition, it might be useful to instruct that machine's monitors 4 to begin collecting and storing specific types of data for specific types of analysis, such as vibration time waveform data for zoom processing. The monitor computer 418 can also be programmed or otherwise requested to perform the zoom processing itself and store only the results of the zoom processing for later transmission to the command station 6. When transmitted to the command station 6, the data stored in accordance with the special request can be further analyzed or otherwise evaluated to diagnose the suspect machine condition.

The command station 6 can be connected to a PC network 10 as shown in FIG. 8. When so connected, the command station 6 is able to transfer data and information directly to the PC network 10 for analysis and archival storage. The PC network 10 also enables an operator to reformat the time slice schedule 18 of FIG. 9. For example, the time slice schedule 18 can be reformatted by changing the order of devices within the schedule 18, changing the length of time allotted to individual slices, and changing the frequency at which status polls will be conducted.

While the above-described time-division methodology can take on many different Configurations, some preferences are hereby noted. Generally, each device in the system is assigned a status poll time slice offset (defined during installation or reconfiguration) which represents the time difference (in milliseconds) between the start of the entire status poll sequence and the start of the assigned time slice for that device. Preferably, transmission of a status poll message from a master device (i.e., command station 6 or repeater 8) to another device (repeater, sensor, monitor) takes no more than 4 milliseconds. Thus, all devices must be properly synchronized to ensure that the proper devices will turn on at the proper time. If devices become unsynchronized such that a device listens or transmits before or after an intended receiving device turns on, then communication may break down. Therefore, to ensure proper synchronization each device is resynchronized during every status poll. Each device receives its own status poll message from the command station 6. Sensors, such as tachometers 5a–c respond immediately to the status poll message, typically in less than 4 milliseconds. Repeaters 8 get responses from their assigned sensors and propagate the status poll message to other repeaters 8 on an individual basis.

The command station 6 sends the status poll message first to sensors to which the command station 6 communicates directly with. Next, the command station 6 sends the status poll message to a first repeater branch. When the status poll response comes back from a first branch, the command station 6 sends the status poll message to a second repeater branch, and so on. If the status poll message rolls over a repeater branch and reaches a repeater with a few sub-branches, then the status poll goes over a first sub-branch comes back and goes to a second sub-branch, and so on. When the status poll response goes back to the command station 6 each repeater 8 adds its own response and the responses of all monitors 4 assigned to it.

The time slice scheduling methodology provides for a highly flexible and adaptable system by enabling plant operators to conveniently add, remove, or otherwise rearrange system components. For example, when plant personnel need to add an additional repeater 8e and monitor 4m, the time slice schedule 18 is easily lengthened to accommodate status polling of the few monitor 4m by adding time slices 88–94.

Each monitor 4 and repeater 8 is sent from the factory in a "blank", "unconfigured" condition. In this state, the monitor computer 418 will operate in its standby (low power) mode has previously described. When a small permanent magnet is brought near the reed switch 425, the monitor's receiver turns on for 0.1 seconds. If no messages are received during this 0.1 second time period, the sensor resumes its standby operational mode.

Figure 10:
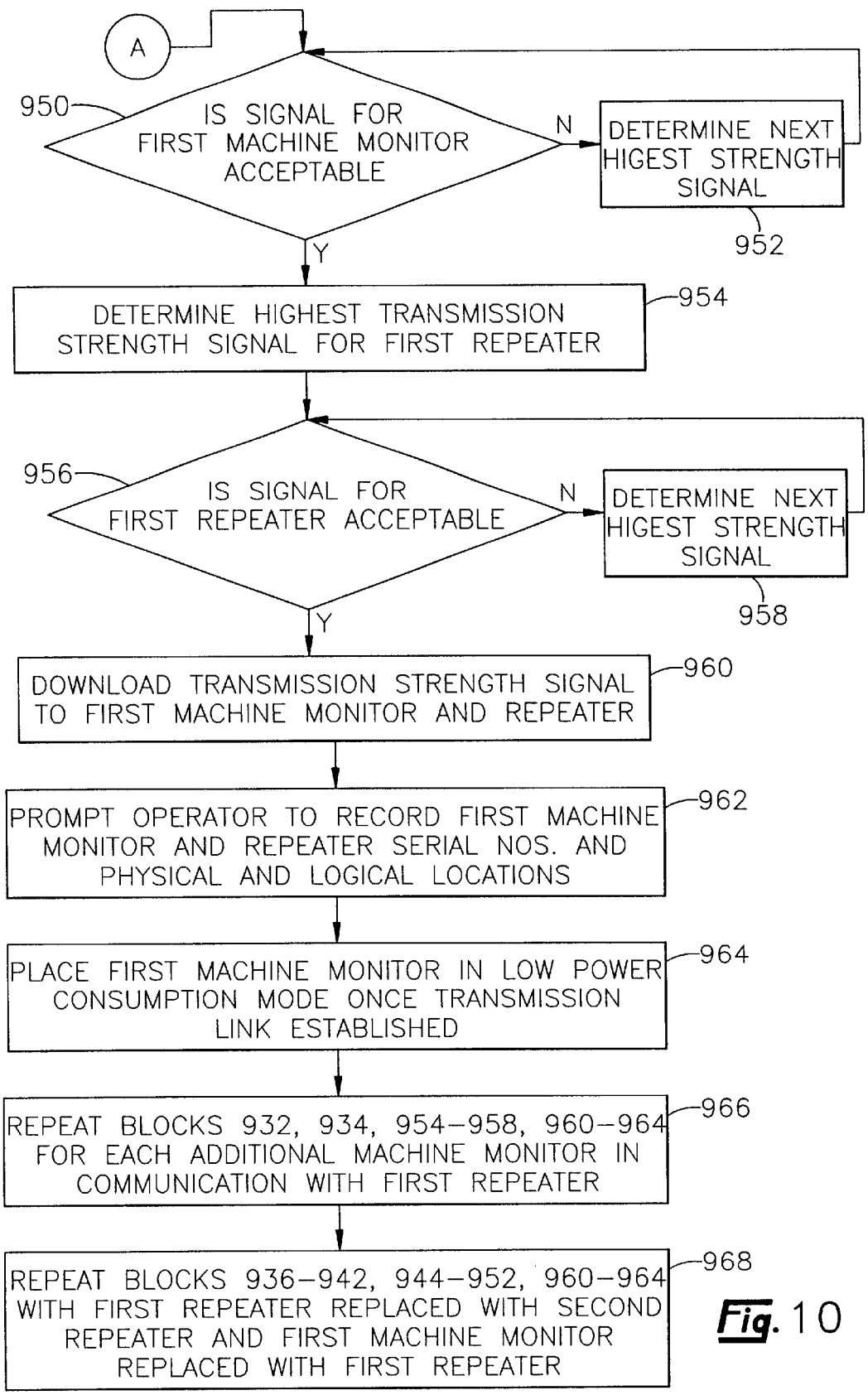
FIG. 10 shows a block diagram of an installation and control unit in accordance with the invention.

During installation and configuration of devices, the user carries an installation and configuration unit, or ICU 9 as illustrated in FIGS. 1 and 10, which in a preferred embodiment consists of a device such as a portable computer modified to accommodate transmission and reception of wireless commands and signals. Alternatively, functions provided by the ICU 9 chain be built into the repeaters 8 and monitors 4.

As shown in the block diagram of FIG. 10, the ICU 9 includes an antenna 902 and transceiver 908 which combine to enable transmission and reception of wireless signals. An ICU computer 912 provides control of user interfaces, preferably a keyboard 920 and LCD display 922, for performing installation and configuration. Wireless commands and signals are generated by the processor 914 in accordance with user inputs and processor programming. Commands are then passed over the serial interface 910 of the transceiver where the command is modulated by modulator 906 and amplified by RF power amplifier 904. The modulated command is then transmitted by antenna 902. Incoming wireless signals are received by antenna 902, demodulated by demodulator 906, and passed over the serial interface 910 to the ICU computer 912. Sensor data received by incoming wireless signals is processed by processor 914 and can be stored in memory 916. A timer 918 is utilized to provide the timing needed by the ICU computer 912 for sending and receiving signals. All possible sources of arcing within the ICU 9 are preferably sealed or otherwise accommodated to prevent the ICU 9 from becoming a possible ignition source in hazardous environments.

To install a new device, the user types information into the ICU 9 concerning the installation of the monitor 4 and is requested by the ICU 9 to place the monitor 4 in startup configuration using the permanent magnet. The ICU 9 communicates with the monitor 4 on channel-0 (the configuration channel). As further described below, the ICU 9 enables the user to determine transmitter signal strengths and to assign the monitor 4 to a repeater 8 if necessary. It also enables the user to assign the monitor 4 a normal communication channel and can indicate lo the user the signal strength as seen by the command station 6. Alternatively, a single communication channel, or frequency is used for all communication, including configuration and normal communication (e.g., normal status polling and other scheduled communications). In this alternate embodiment, configuration takes place after normal communication is completed if the spread spectrum pseudo-noise (PN) code (as further described below) used for configuration is the same as the PN code used for normal communication. However, a more preferred method of employing single channel communication is to utilize a distinct PN code for configuration and a distinct PN code for normal communication so that configuration can occur during normal communication without interference.

The user can employ the ICU 9 to determine where repeaters 8 must be placed and how to configure (program) them. The user does this by typing the necessary information on the ICU menu through the keyboard 920 and pressing the "configure" button on the repeater 8. This causes the repeater 8 to wake up and listen for configuration commands for 15 seconds. The user then presses the "configure" function key on the ICU keyboard 920, causing the ICU 9 to transmit the configuration parameters on a special, "configuration" communication frequency to the repeater 8. When the repeater 8 receives this command, it will set up its configuration parameters (address, communication parameters, and others) and transmit an acknowledge message back to the ICU 9. Once the address has been set, the repeater 8 changes to the normal communication channel and begins to adjust its transmission strength and the transmission strength of the device from which it receives commands. After this is done, a repeater 8 initiates the process of processing configuration polls. Configuration polls may be issued, for example, every 15 seconds. The purpose of these polls is to enable the ICU 9 to determine and display to the user the communication strength of each repeater 8 and monitor 4. This information is updated on the ICU 9 display every 15 seconds, enabling the user to roam around the plant and install repeaters 8 and monitors 4 where necessary, and thereby install a functioning system. The 15 second configuration polls are routinely transmitted by the command station 6 and function as follows:

Every 15 seconds, the command station 6 transmits a configuration status poll command. Each monitor 4 and repeater 8 powers up its transceivers and transmits a reply sequence based upon its configured poll slice value. After it has received all replies, the command station 6 transmits a composite message to the ICU 9 telling it the results of the status poll. The ICU 9 then updates its display 922 with this information. After the ICU 9 has received the status information from the command station 6 it transmits a reply back to the command station 6, informing the command station 6 of any functions which the user wants it to perform. This enables the ICU 9 to instruct monitors 4 and repeaters 8 (indirectly via the command station 6) to return to the configuration channel for re-configuration or other functions.

The configuration command is transmitted on the configuration channel by the ICU 9 and contains the following information:

(a) device address
(b) poll slice value (in milliseconds)
(c) communication channel for normal communications
(d) current date/time
(e) date/time of first status poll
(f) date/time of system startup.

This command is never received by the command station 6, or by monitors 4 and repeaters 8 which are already configured, since it is transmitted on a special configuration channel.

All other configuration commands are processed on the normal communication channel and are transmitted by the command station 6. Although the ICU 9 relays requests for these commands to the command station 6, it is the command station 6 which actually sends the commands to the monitor 4 or repeater 8.

Commands which can be sent by the command station 6 include the following:

(a) Configuration status poll
(b) Re-configuration poll command
(c) Return to configuration channel for re-configuration (post poll command)
(d) Repeater/monitor deletion
(e) Change date/time of system startup (post poll command, the system will start its normal operation at the designated date/time.

The ICU 9 is assigned as a special sensor unit to the command station 6 with an address of -1 and the initial poll slice 20. This initial time slice 20 is reserved for communication with the ICU 9 to tell the command station 6 to switch to configuration mode or to issue some special commands. The ICU 9 can also communicate with each repeater 8. After a particular repeater 8 receives a final response to a status poll 18 from its group of monitors 4, there is a 4 millisecond time slot for the ICU 9 to transmit a short status message to a repeater 8. In an alternate Embodiment, the functions of the ICU 9 are built into each monitor 4.

During system setup or when adding new devices to an existing system, devices which Communicate directly with the command station 6 are configured first. Each device is separately configured. A Configuration Poll Command is issued by the command station 6 every 15 seconds and the poll results are transmitted to the ICU 9. The ICU 9 also responds to the status polls by transmitting its status directly to the command station 6. The user walks around with the ICU 9. Every 15 seconds, the command station signal strengths are determined by the ICU 9 from the status poll results being transmitted by the command station 6. When the ICU receive signal strength falls below a certain level, the user knows that a repeater 8 (or monitor 4) should be installed and configured. The user then keys in the necessary information and causes the ICU 9 to transmit the configuration information to the device being configured. The ICU 9 commands the device to transmit a signal strength scan using a predefined code. The scan code for each strength level includes unique identifying information. The command station 6 receives the scan signals and, after completion of the scan, transmits the best repeater transmission level to the ICU 9 which then relays it to the device. The device sets its transmitter strength to this level and sends a message to the command station 6 requesting a transmission scan. After the command station 6 completes its transmission scan, the device being configured sends a message to the command station 6 requesting the command station's best transmission level. This request is acknowledged by the command station 6 by transmitting a special entry code which ends the device's configuration if it is a monitor 4. If the device being installed is a repeater 8, it is preferable to temporarily install a few probe sensors in places where monitors 4 will ultimately be installed.

The probe sensors listen to the last transmission scans of the repeater 8 being installed and the command station 6 and transmits the three best signal levels to the ICU 9. The ICU 9 checks whether the probe sensors can receive a good transmission from the repeater 8 being installed and whether they can be assigned to the command station 6. If all probe sensors can receive good transmissions only from the repeater 8 being installed, the ICU 9 transmits a final message to the command station 6 informing it that device installation is complete. In all other cases, both the command station 6 and the device being installed terminate communication with the ICU 9. The user is prompted about his decision on the device arrangement and the user's decision is sent to the command station 6 when it next communicates with the ICU 9.

Devices which do not communicate directly with the command station 6 are installed in similar fashion with the exception that instead of communicating with the command station 6, the ICU 9 communicates with the immediate repeater 8 or other command device of the device being installed. After a new device is configured with its immediate repeater 8, the immediate repeater 8 sends a Unit Configuration Request to the command station 6 (possibly by way other intermediate repeaters 8). After a response is received from the command station 6, the device is configured with the system. All repeaters 8 in the communication chain between the command station 6 and the immediate repeater 8 listen to the command station response and update their monitor/repeater lists accordingly.

When a repeater installation is complete, the ICU 9 responds to the next 15 second poll by transmitting its status and a command to the designated repeater 8, instructing the repeater 8 to inform the command station 6 as to which repeater 8 the ICU 9 is currently communicating through. Subsequent status polls are transmitted via the repeater 8.

All devices are installed in the order of their position in the time slice schedule 18. Installation can be terminated and resumed at any time by transmitting the appropriate signal from the ICU 9 to the command station 6.

At the completion of the installation process, the user initiates system startup from the command station 6. This causes a startup command to be issued, terminates the 15 second polls, and initiates the 60 second polls. In addition, all monitors 4 start their normal data collection functions.

A Re-configuration Poll Command precedes the Configuration Poll Command in an already existing system and when new devices will be assigned a time slice which is not at the end of the time slice schedule 1. In the latter case, a time window for new devices to receive a status poll will be made by adding a time delay to some poll slice values for existing devices. The poll slice values might also be subject to additional changes caused by longer transmissions back to the command station 6.

In the case of an existing system, the command station 6 is informed by the ICU 9 when on-line setup is occurring and all command station activities are stopped, except for the configuration status poll activities, and the command station 6 enters its installation/configuration mode. In the case of a new system, the command station 6 is powered up and set by the ICU 9 for configuration.

During the setup/configuration process, the monitor 4 receives a unique monitor 4 ID number (address), a date/time synchronization by the command station 6 (current time/date), and a date/time of a monitor's first status poll. At the date/time of the first status poll, the monitor 4 will turn on its transceiver and wait to receive a status poll command. If no status poll command is received within 60 seconds, the monitor 4 will go into a "lost synch" loop.

Every time a monitor 4 does not respond to a status poll, the repeaters 8 and the command station 6 record the monitor's status as "not responding" and the date/time the monitor 4 went out of service is logged in a communications journal file by the command station 6. If the monitor 4 returns to service some time later, the date and time of this is also recorded. There are several reasons why a monitor 4 might not respond, including poor communications signal strength, transmission noise, clock error affecting the synchronization of the status poll processing, low battery, hardware failure, removal of monitor 4, and others. If the monitor timer 424 has become unsynchronized with the command station 6, it could be listening for a status poll command at the wrong time. In this case, every minute, the monitor 4 listens for a longer and longer time period so that it can become synchronized. If after 15 minutes the monitor 4 has failed to re-synchronize, then the problem is obviously not due to clock synchronization, but most likely the result of a problem at the command station 6 or a repeater 8 (probably removed from service). In this case, the monitor 4 will begin to process its "lost synch" loop in order to re-establish communications when the problem has been resolved, as follows:

Every 1 minute for the first 10 minutes, the monitor 4 will power up its transceiver for 0.6 seconds at (T=−0.3 seconds) to attempt to receive a status poll.

Every 10 minutes for the first 1 hour, the monitor 4 will power up its transceiver for 6 seconds at (T=−3.0 seconds) to attempt to receive a status poll.

Every one hour for the first 12 hours, the monitor 4 will power up its transceiver for 60 seconds at (T=−30 seconds) to attempt to receive a status poll.

Every 12 hours, the monitor 4 will power up its transceiver for 60 seconds at (T=−30 seconds) to attempt to receive a status poll. This will repeat continuously until the monitor 4 is resynchronized.

During normal communications, the monitor 4 powers up once every 60 seconds. As data is acquired by the monitors 4, it is preferably stored in memory 422 for a period of time. When the monitor 4 transmits an alarm message to the command station 6, the command station 6 may then command the monitor 4 to transmit its most recently stored data. For example, the monitor 4 can be programmed (either at the factory before being shipped, by the ICU 9 during installation or reconfiguration, or through appropriate wireless commands transmitted by the command station 6 before, during, or after installation) to store spectral data for each vibration measurement obtained during the most recent week of measurement activity. When the monitor. 4 is in alarm and the command station 6 issues the appropriate command, the monitor 4 transmits all of its spectral data that has been stored over a previous time period, such as the past week. The spectral data can then be further analyzed to help diagnose causal factors which produced the alarm condition.

Although a time-division communication protocol, such as the one described above, is preferably employed to perform status polling of the monitors 4, a non-time division communication protocol can also be employed to perform status polling. Non-time division communication is particularly useful for supplementing data and information obtained during time-division status polling, such as when an alarm condition is signaled during a status poll. For example, when a time-division status poll is completed and a particular monitor 4 has communicated to the command station 6 that an alarm condition exists, the command station 6 will utilize a non-time division communication protocol to command the monitor 4 to transmit its stored data. During non-time division communication, there is no transmission or reception time scheduling. Instead, the command station 6 transmits a command requesting stored data from a particular monitor 4 (or requesting the monitor 4 to perform other functions including status polling). If the communication link between the monitor 4 and command station 6 is by way of one or more repeaters 8, the first repeater 8 in the chain will receive the request for data from the command station 6 and acknowledge such receipt by transmitting an "ACK" signal. The command station 6 receives ACK and waits for data transmission while the first repeater 8 transmits the data request to the monitor 4 or the next repeater 8 in the chain, depending on the system arrangement. In contrast to the methodology employed during time-division communication, all repeaters 8 which are included in the communication chain remain on after the data request has been repeated and wait for the requested data to be transmitted. When the data has been received and retransmitted to the next repeater 8 or command station 6, the repeater 8 turns off.

To illustrate how data is transmitted from a monitor 4 to the command station 6 during non-time division communication, assume that monitor 4c shown in FIG. 8 transmitted an alarm message during a status poll. The communication chain, assuming no blockage of repeaters 8, includes repeaters 8b and 8c. Following the status poll in which monitor 4c indicates an alarm condition, the command station 6 transmits a request for data to repeater 8c, which powers up to listen for command signals at a predetermined time following status polling. Repeater 8c transmits ACK to the command station 6 and repeats or transmits the data request to repeater 8b. Repeater 8b transmits ACK to repeater 8b to acknowledge proper receipt of the data request and transmits the data request to monitor 4c. After repeating the data request, each repeater 8b, 8c remains on in asynchronous fashion and waits for transmission of the requested data. The repeaters 8b, 8c do not turn off until the requested data has been received and retransmitted to the next repeater or to the command station 6.

The command station 6 looks at the results of the status poll responses. When it is discovered that a device did not respond to the status request, the command station 6 will continue normal status polling for 15 minutes to allow time for the lost device to resynchronize. If resychronization is not successful within 15 minutes, then the cause is probably either a depleted battery or a blocked communication path. In situations where battery depletion is unlikely, the command station 6 assumes that the communication path is blocked and signals the blocked condition to the user. To compensate, the command station 6 selects a group of repealers 8 and sends them a command to be relayed to the lost device during their time slices. Within this command, the command station 6 requests a transmission strength scan to be performed by the lost device at a specified time Tx. At the specified time, all selected repeaters 8 listen for a fixed amount of time, after which the repeaters 8 send the results of the strength scan to the command station 6. The command station 6 selects one repeater 8 from those which indicated positive results of the strength scan and commands the selected repeater 8 to perform its transmission scan with encoded best transmission strength of the lost device at time Tx +60 seconds. After this scan has completed, the lost device replies to its new repeater 8 and sends its best transmission strength. The new repeater 8 acknowledges the lost device's transmission by informing it that its temporary status poll slice will be the ICU time slot of the new repeater 8. After synchronization of the lost device with the new repeater 8, the command station 6 sends the Re-configuration poll command to make a permanent time slice for the lost device.

In an alternate procedure for compensating for a blocked device, the command station 6 maintains a Re-Configuration Look-Up Table in which a list is maintained for all devices that each repeater 8 can communicate with at any given time. When a device becomes lost due to blocked communication, the command station 6 reassigns the lost device to a new repeater 8.

In addition to power saving features previously described, the monitor 4 also conserves power by transmitting data only during preprogrammed intervals or time slots where the timing of the intervals is provided by the timer 424. Each transmit interval either coincides with the measurement intervals of the sensors 408 so that real-time sensor data is transmitted, or the transmit intervals are scheduled so that data previously stored in the machine monitor memory 422 is transmitted. Transmission scheduling is controlled by the user or operator according to the desired communication protocol programmed into the monitor computer 418. The protocol can be programmed into the monitor computer 418 either before installation or during installation. Protocols can also be installed or changed from the command station 6 after installation, thereby providing the system with the flexibility needed to accommodate system changes such as the addition, removal, or replacement of monitors 4.

Data (including status) and other communication signals are preferably transmitted in a spread spectrum format. In this scheme, a radio-frequency (RF) signal is modulated using a digital coding sequence which spreads the signal energy over a fairly broad bandwidth, thereby making the signal resistant to interference from other nearby RF emitters.

As shown in FIG. 3, a preferred embodiment incorporates a radio frequency (RF) transceiver 430 which performs data transmission as well as data reception. The transceiver 430 of this preferred embodiment further consists of a modulator/demodulator circuit 432, such as the Harris HSP 3824 spread spectrum processor, which, in the transmit mode, modulates a carrier wave (CW) signal with the baseband digital sensor data. The CW signal is fed to an RF power amplifier circuit 434, such as the Hewlett Packard HPMX3003, which amplifies the CW signal into an RF signal to be transmitted from the antenna 406.

The transceiver 430 also provides for receiving and decoding messages from the command station 6 which are transmitted to the machine monitor 4 in the form of RF signals. Such messages include: (1) timing messages which synchronize the machine monitor timer 424 to the command station computer's clock; (2) scheduling messages which tell the machine monitor 4 when, what, and how to measure, analyze, and transmit the sensor data and when to receive other messages from the command station 6; (3) confirmation messages which tell the machine monitor 4 that the command station 6 has accurately received the sensor data transmissions; (4) special request messages which command the machine monitor 4 to perform special data analysis functions (or special data sensing, storage, or transmission); and (5) reprogramming messages which provide new measurement, analysis, and transmission programming for the monitor computer 418. The RF signals from the command station 6 are received by the antenna 406, down-converted to IF by the up-converter/down-converter circuit 434, demodulated by the modulator/demodulator circuit 432 to form baseband data signals, and fed over the serial interface 426 to the data processor 420.

The receive circuits of the machine monitor transceiver 430 are not continuously on, but, to conserve power, are turned on only when necessary to receive messages from the command station 6. The "on time" of the receive circuits is scheduled by the operator according to instructions programmed into the monitor computer 418. At the scheduled times, a message from the timer 424 causes the monitor computer 418 to send power-on messages to the receive circuits of the monitor transceiver 430. The receive circuits stay energized until an error-free message is received from the command station 6, at which time the monitor computer 418 sends a shutdown message to the receive circuits of the monitor transceiver 430.

Figure 4:
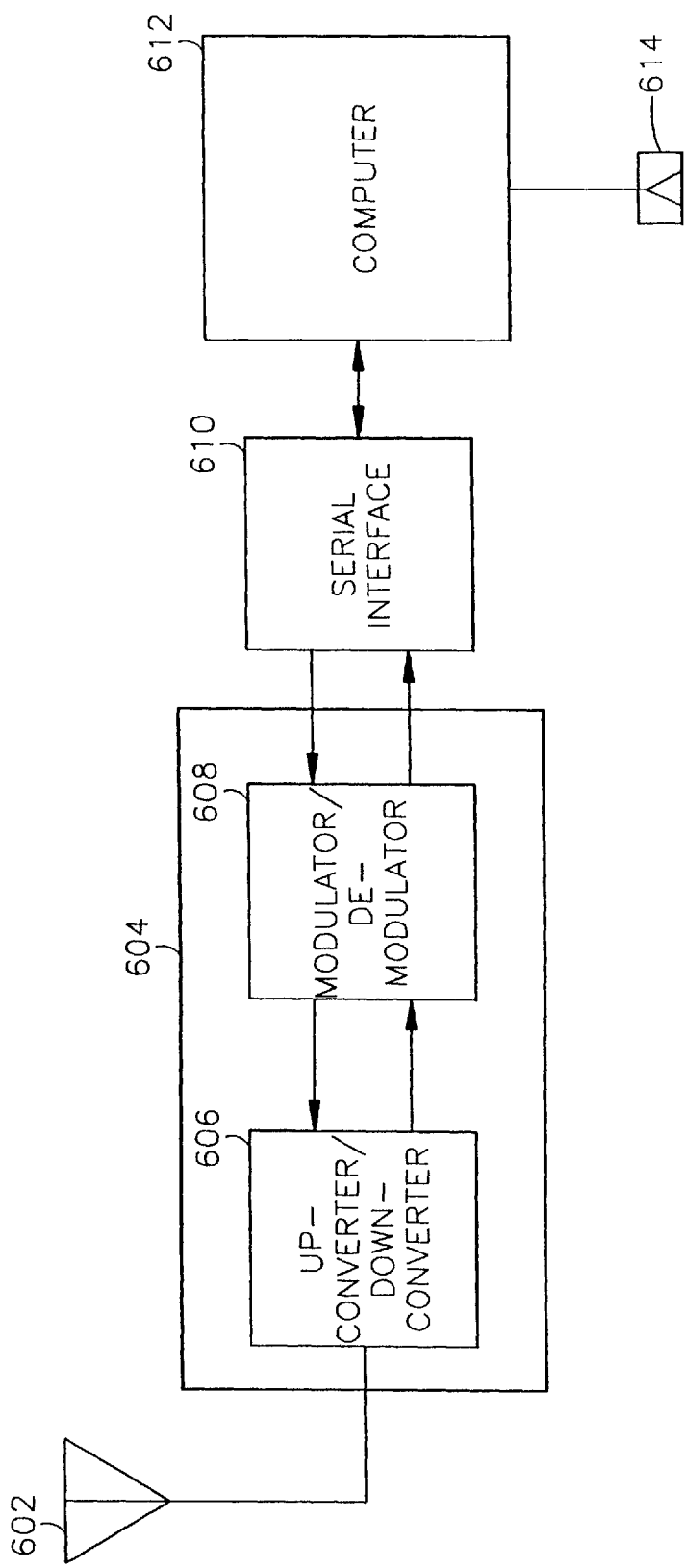
FIG. 4 shows a block diagram of the command station element of a preferred embodiment of the invention.

A block diagram of the command station 6 of FIG. 1 is shown in FIG. 4. The RF signal transmitted from the machine monitor 4 is received by an antenna 602 at the command station 6. A transceiver 604, which includes an RF power amplifier/down-converter circuit 606 and a modulator/demodulator circuit 608, such as those previously discussed in the description of the machine monitor 4, downconverts and demodulates the RF signal to recover the digital sensor data. The sensor data is fed over a serial interface 610 to a command station computer 612, such as a personal computer incorporating a Pentium processor or equivalent, where the information is preferably monitored in real-time for machine fault conditions and is entered into a data base for off-line trend analysis. The transmit circuits of the command station transceiver 604, provide for the transmission of timing, scheduling, and programming messages to the machine monitor 4.

Figure 5:
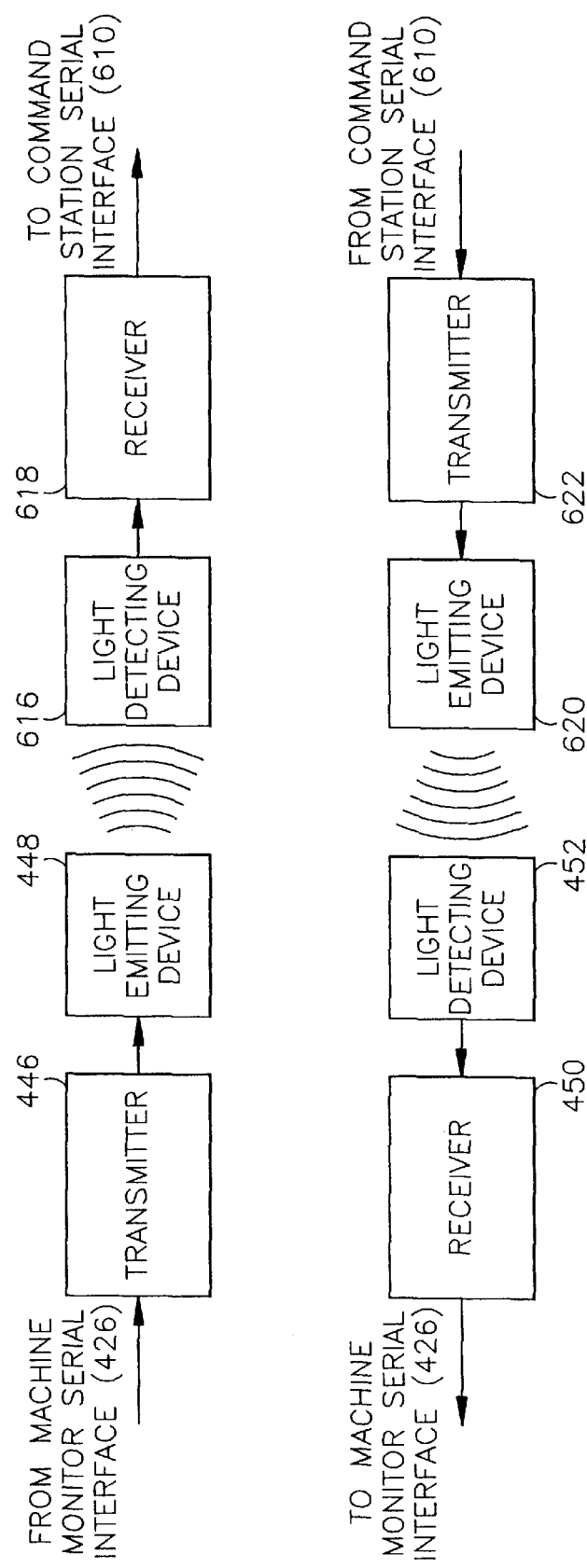
FIG. 5 shows a block diagram of the transmit and receive sections of the machine monitor and the command station of an alternative embodiment of the invention.

In an alternative embodiment of the invention, the machine monitor 4 communicates with the command station 6 by means of light waves. As shown in FIG. 5, the machine monitor transmitter 446 of this embodiment receives digital sensor data from the machine monitor serial interface 426 and modulates an electrical signal which drives a light emitting device 448, such as a light emitting diode (LED). The light emitting device 448 converts the electrical signal from the transmitter 446 into light waves which are modulated with the digital sensor information. At the command station 6 of this embodiment, a light detecting device 616, such as a photodiode, receives the light waves from the light emitting device 448 of the machine monitor 4 and converts the light waves into an electrical signal. With continued reference to FIG. 5, the command station receiver 618 amplifies and demodulates the electrical signal at the output of the light detecting device 616 to form a digital electrical signal which is compatible with the data format of the command station serial interface 610. The sensor data is then passed over the serial interface 610 to the command station computer 612 for processing as described above. A similar series of operations are performed to transmit messages from the command station 6 to the machine monitor 4 as shown in FIG. 5.

A preferred embodiment of the invention provides for error detection in the data that the command station 6 receives from the machine monitor 4. In accordance with a preferred error detection scheme, the machine monitor 4 transmits a 16-bit cyclic redundancy check (CRC16) message immediately after transmitting the sensor data message. Upon receipt of the sensor data message and the CRC16 message, the command station 6 computes its own CRC16 message based on the received data and compares it to the received CRC16 message. If the received and computed CRC16 messages match, then no errors exist in the received sensor data, and the command station 6 transmits an acknowledgment message to the machine monitor 4 to confirm that the sensor data has been accurately received.

To preclude the possibility of a transmission from one machine monitor 4 interfering with a transmission from another machine monitor 4, preferably, data transmission times for each machine monitor 4 are scheduled such that only one machine monitor 4 is transmitting at any given time (time division mutliplexing). By accurate synchronization of the machine monitor timer 424 with the command station clock, the command station 6 "listens" for the transmission of only one machine monitor 4 at the precise time when the command station 6 has commanded the machine monitor 4 to transmit.

To enable the command station 6 to verify which machine monitor 4 is transmitting a data message, each machine monitor 4 transmits a unique identification code prior to the sensor data message. The identification code combined with the sensor data message comprise a data packet. The identification code is stored within the machine monitor 4 by means such as a set of DIP switches or a non-volatile RAM, the state of which determines the value of the identification code to be stored in the monitor computer memory. The identification code transmitted by the machine monitor 4 is received by the command station 6, and the command station computer 612 compares the code to values stored in a table within the command station computer 612.

In an alternative embodiment of the invention, the possibility of interference is reduced further by programming each machine monitor 4 to transmit with its own distinct spread spectrum pseudo-noise (PN) code (code-division multiplexing). The command station 6 then listens for a particular code assigned to a particular machine monitor 4 at the designated transmission tune.

Another alternative embodiment of the invention utilizes frequency multiplexing to preclude interference between transmissions from multiple machine monitors 4. In this embodiment, each machine monitor transceiver 430 is assigned a unique frequency band over which to transmit the sensor data to the command station 6. The command station transceiver 604, as commanded by the command station computer 612, listens for a particular machine monitor 4 on the assigned frequency band at the designated transmission time.

While it is preferable to transmit a signal from the machine monitor 4 to the command station 6 only at scheduled times, it is contemplated that the machine monitor 4 could also incorporate means of continuously sensing an extreme fault condition of the machine being monitored, such as the use of tuned reed switches for detecting an extreme vibration condition. When such an extreme fault condition occurs, the monitor computer 418 "wakes up" from the standby mode, processes the signal from its one or more sensors 408, and transmits a data packet consisting of the machine monitor's identification code and the sensor data to the command station 6. To avoid interference with regularly scheduled data messages, these fault messages are transmitted only during special time intervals which are individually assigned to each machine monitor 4 specifically for the transmission of fault messages. Between the time intervals scheduled for "regular" sensor data transmissions, the command station 6 listens for fault messages from the machine monitors 4. Depending on the number of machine monitors 4 under the control of a particular command station 6, several such fault message intervals are available to each machine monitor 4 between the scheduled intervals for "regular" sensor data transmissions.

Figure 6:
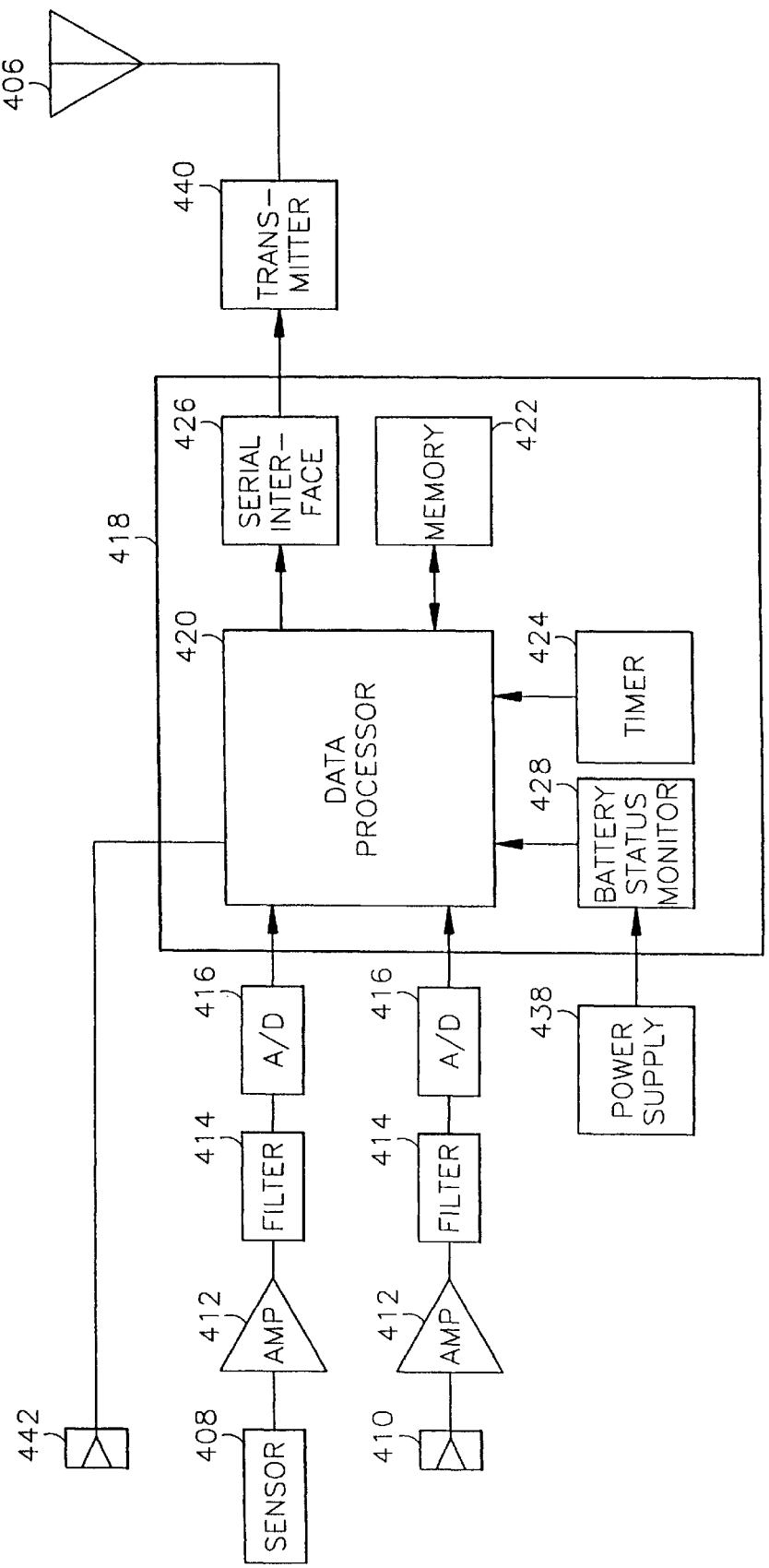
FIG. 6 shows a block diagram of the machine monitor element of an alternative embodiment of the invention.

Although the machine monitor preferably includes means for receiving messages from the command station 6, an important function of the invention, the monitoring and analysis of machine characteristics, can be accomplished without a receiving means included in the machine monitor 4. FIG. 6 is a block diagram of a receiverless machine monitor 4 of an alternative embodiment of the invention. This embodiment includes a transmiter 440, not a transceiver. Instead of receiving wireless messages from the command station 6 to set the machine monitor's start-up and shut-down times, these times are programmed into the monitor computer memory 422 via an interface cable prior to installation of the machine monitor 4 in the machine. During programming, the interface cable is connected between the monitor computer 418 and the command station computer 612, utilizing interface connectors 442 and 614 in the machine monitor 4 and the command station 6, respectively, synchronization of the machine monitor's timer 424 with the command station's clock is also accomplished via the cable interface. In this alternative embodiment, the data analysis function to be performed by the machine monitor 4 is likewise programmed into the machine monitor computer 418 via the cable interface prior to installation of the machine monitor 4 in the machine to be monitored. Once programming and timing calibration are complete, the interface cable is removed and the machine monitor 4 is attached to the machine.

While the machine monitor 4 is preferably battery powered to accommodate a completely wireless installation in the machine to be monitored, a second alternative embodiment of the invention is useful in those situations which require continuous monitoring of a machine characteristic, and a continuous source of power is available at the machine location. This alternative embodiment incorporates a power conditioner circuit so that the machine monitor 4 may be connected to the AC power source at the machine site. The power conditioner converts the AC source voltage to the appropriate level of DC voltage for each component of the machine monitor 4 and filters the source voltage to remove noise generated on the AC line by nearby machinery.

Figure 7:
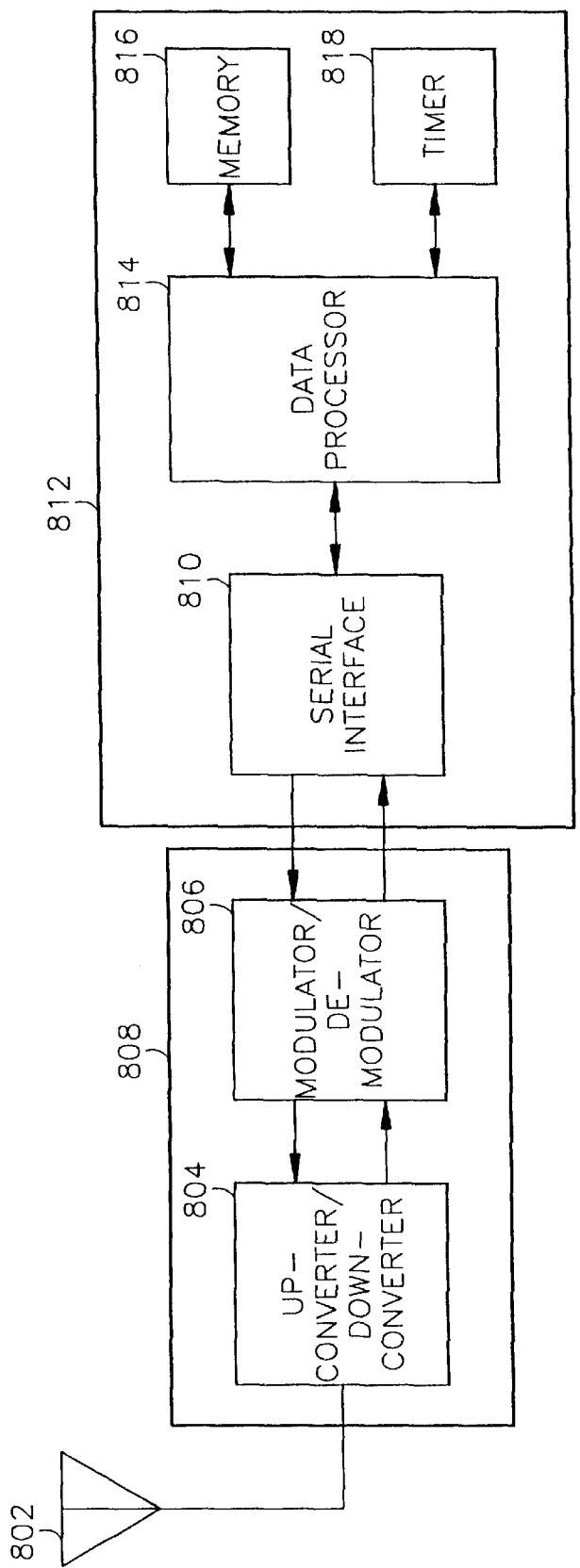
FIG. 7 shows a block diagram of the repeater element of a preferred embodiment of the invention.

The repeater 8 of FIG. 1 is shown in block diagram form in FIG. 7. The RF sensor data message from a machine monitor 4 is received by the antenna 802, converted down to IF by the down-converter circuit 804, and demodulated by the modulator/demodulator circuit 806 to recover the original baseband sensor data. The sensor data is then passed over the serial interface 810 of the repeater computer 812 to the data processor 814. The sensor data is then either stored in memory 816 or is passed to the modulator/demodulator circuit 806 and the RF power amplifier/down-converter circuit 804 of the repeater transceiver 808 to create a "new" RF sensor data signal. This signal is transmitted from the repeater antenna 802 to the command station 6. The repeater 8 operates in a similar fashion when relaying data from the command station 6 to the machine monitors 4.

A timer 818 provides the clock signals necessary for proper timing of the receive and transmit intervals for each machine monitor 4 assigned to the repeater 8. The repeater computer 812 sets up the transceiver 808 with the correct spread-spectrum PN code for the particular machine monitor 4 that the repeater 8 is servicing at any given time.

The repeater's transceiver 808 and computer 812 are of the same type as, or are functionally equivalent to, the corresponding components of the machine monitor 4. In a preferred embodiment, the operation of the repeater 8 is "transparent" to the other components of the system, that is, the other components function in the same manner as they would if the repeater 8 were unnecessary and not in the system.

Since a repeater 8 is designed to service many machine monitors 4, a repeater 8 is typically operable at a higher duty cycle than that of a single machine monitor 4. For this reason, the repeater 8 is preferably continuously powered by a line carrying power to the repeater 8, such as a standard AC power outlet, or by power that is hard wired during installation. Alternatively, the repeater 8 may be battery powered with batteries that have greater storage capacity that those used in the monitors 4. Typically, the location of a repeater 8 is flexible enough to enable the repeater 8 to be hard wired for power, while still adequately servicing the machine monitors 4. For many installations, the ceiling of the facility provides an excellent location for repeaters 8. Continuous operation enables the repeater 8 to be continuously "listening" for fault messages from the machine monitors 4 which the repeater 8 services.

As may be appreciated from the above description, installing or modifying the wireless machine monitoring system may be complex. In the preferred embodiment, installation or modification is achieved efficiently and expeditiously by the method described below.

Figure 11:
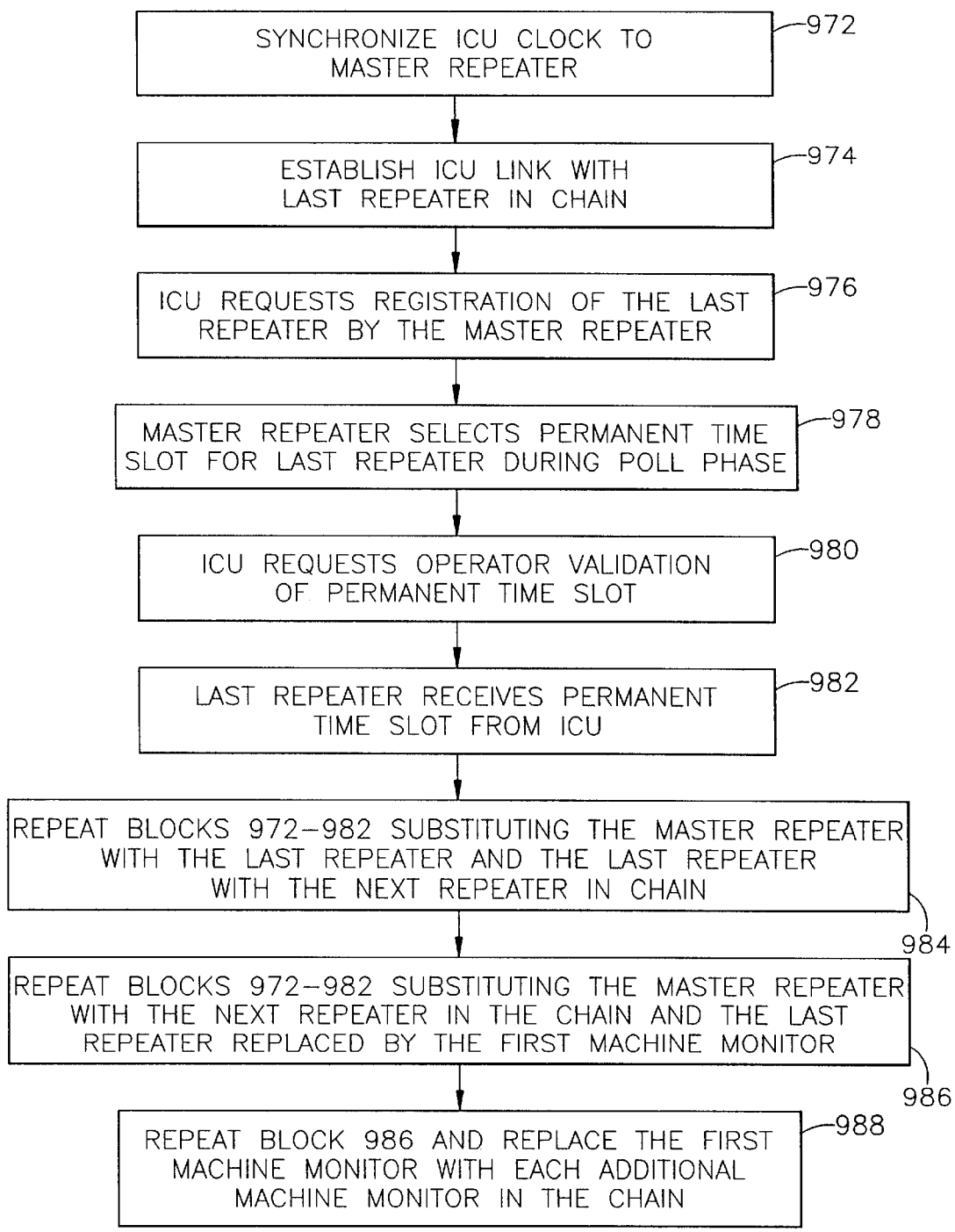
FIG. 11 is a schematic of a single chain of a wireless machine monitoring system.

A wireless machine monitoring system 995 is shown in FIG. 11. The present system 995 preferably includes at least one chain 930, which includes at least one relay repeater 8b and at least one machine monitor 4a. The relay repeater 8b is in wireless communication with the machine monitor 4a via infrared or preferably RF means. In wireless communication with the chain 930 is a master repeater 8m, which is preferably coupled to the command station 6 via a communications port but could also be in wireless communications with the command station 6 depending upon whether the command station 6 is remotely located from the master repeater 8m. Each relay repeater in each of the chains of the present wireless machine monitoring system 995 preferably includes memories (volatile and non-volatile), a 16 bit Toshiba Microprocessor, and firmware, hardware, and software for receiving and transmitting wireless communications data. It is not contemplated in the present invention that the master repeater 8m will contain any different firmware, hardware, or software, but it is understood that such could be implemented if needed. The master repeater 8m and the relay repeaters 8b and 8c of each chain 930 also include a programmable, real time clock for sequencing time operations of the master repeater 8m and relay repeaters 8b and 8c of the wireless machine monitoring system 995, as will be discussed in greater detail below.

The basic components of the present wireless machine monitoring system 995 contained within each chain 930 may be configured in various ways such that the least amount of components are used for optimal wireless communications. If a particular machine is positioned within an industrial setting such that a machine monitor 4a for that machine is physically located beyond the transmit and receive wireless communications range of the command station 6, or removed from line of site of the command station 6, a repeater 8a is used to receive signals from, and transmit signals to the machine monitor 4d. If more than one repeater is needed for wireless communications between the command station 6 and the machine monitor 4a, an additional repeater 8c may be used to transmit and receive signals between the repeater 8b and the command station 6. It is understood, however, if only one repeater is needed for wireless communications between the command station 6 and the machine monitor 4a, the relay repeater 8b can also serve as the master repeater 8m.

The communication cycle of the present wireless machine monitoring system 995 includes two primary phases. The first is a configuration phase, which has two stages, a low level stage and a high level stage. The low level stage includes initial installation of the components of the present wireless monitoring system 995 including downloading setup configuration parameters to each repeater in the system 995 and to each motor monitor in the system 995. Also in the low level stage, the minimum transmit power level that results in an acceptable BER for each of the machine monitors 4a in relation to its particular repeater 8b is determined. Therefore, to fully implement the preferred embodiment, the machine monitors 4a, 4b, and 4c should be capable of altering their transmit power levels. In addition, the minimum transmit power levels between each repeater 8b, 8c, and 8m in the chain 930 are determined. Thus, the repeaters Sc, 8b and 8m should also be able to vary their transmit power levels. However, if the repeaters such as 8b are provided power by connection to an AC outlet instead of being battery powered, the power requirements for the repeaters 8b become relatively unimportant. Thus, in an embodiment with AC powered repeaters 8b, the repeaters 8b Can simply be configured to transmit at their maximum power level.

Figure 12:
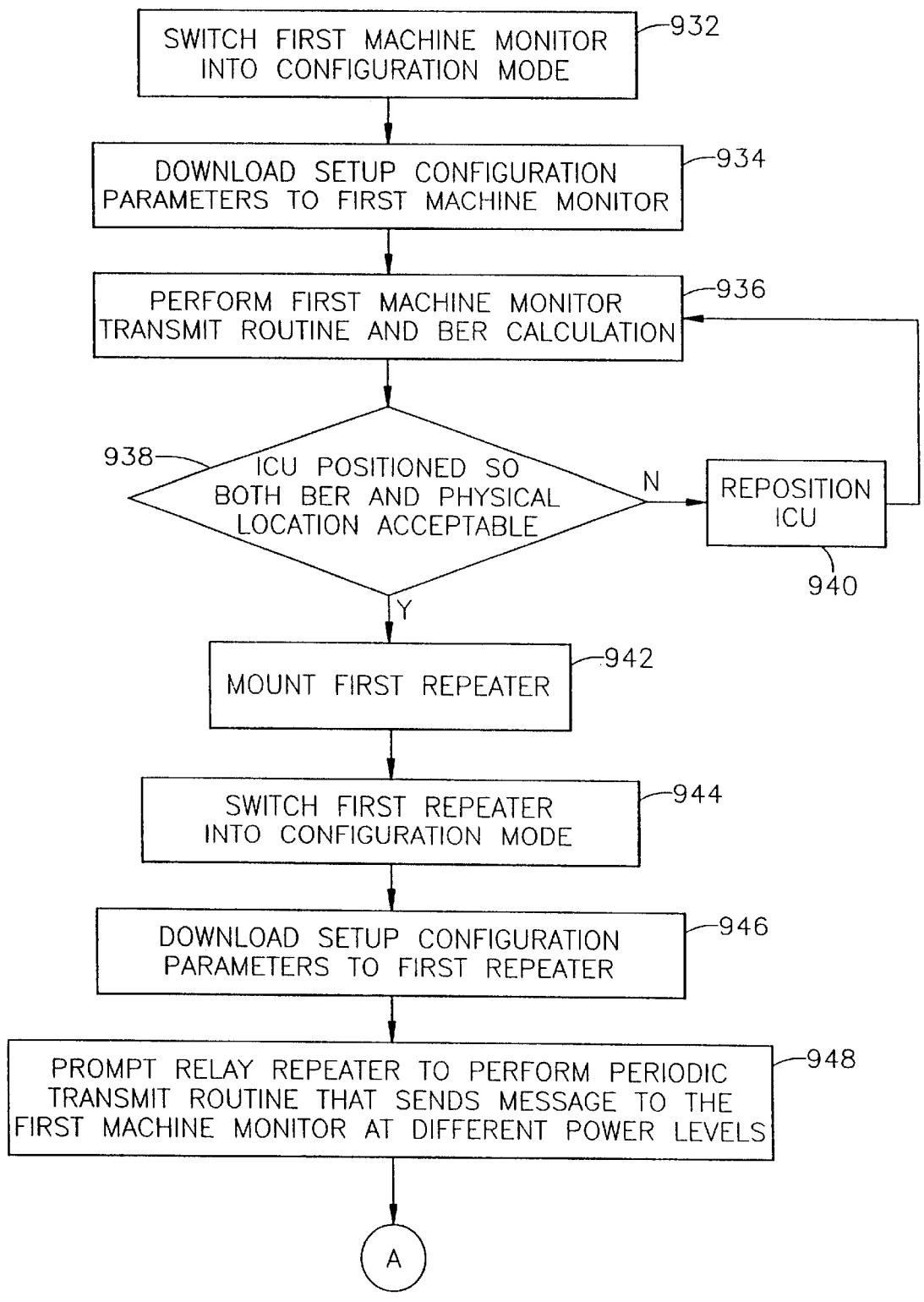
FIG. 12 is the first portion of flow chart of a method for configuring a wireless machine monitoring system.

A method is shown in FIG. 12 for the low level stage of the configuration phase of the present invention. The method begins in task block 932 whereby a first motor monitor 4a is switched into a configuration mode by an operator. The Installation and Configuration Unit ("ICU") 9, as illustrated in FIG. 10, preferably consists of a microprocessor based system, such as a portable computer, hand-held computer, or personal data assistant with a repeater connected to the communications port thereof (preferably the serial port) that is modified to accommodate transmission and reception of wireless communication signals. Alternatively, functions provided by the ICU 9 can be incorporated into the relay repeaters 8c and 8d and the machine monitors 4a, 4b and 4c. The method then moves to task block 934 whereby the ICU 9 downloads setup configuration parameters to the first machine monitor 4a.

The next step of the low level stage of the present wireless machine monitoring system 995 is to determine the exact physical location of the first repeater 8b in the chain 930. Preferably, in the present invention, the relay repeater 8b should be within 100 meters of any other wireless device with which the relay repeater 8b will be communicating. Likewise, the relay repeater 8b should be in sight-line view of any wireless devices with which it will communicate. The ICU 9 is placed in the potential desirable location for the first repeater 8b. In many instances, the most desirable location for the relay repeater 8b is the ceiling of the room in which the machine being monitored is located.

In task block 936, the ICU 9 initiates a periodic transmit routine in the first machine monitor 4a, whereby data is wirelessly transmitted to the ICU 9. The ICU 9 receives this data and performs a BER calculation on the data. The BER calculation determines the number of bit errors per bit of data received over a set period of time and is calculated by software within the ICU 9. The method then moves to decision block 938 whereby the operator, or a program contained in ICU 9, decides whether or not the ICU 9 is physically positioned so that both the BER and physical location are acceptable for the first relay repeater 8b in the chain 930. If the physical location or BER is not acceptable at the location of the ICU 9, the method traverses to task block 940 whereby the ICU 9 is repositioned and the preferred method returns to decision block 936. After repositioning, another transmit routine and BER calculation are performed to determine whether the ICU 9 is now positioned in an acceptable location for the first relay repeater 8b in the chain 930. If, however, the answer in decisional block 938 is yes, the method moves to task block 942 whereby the first relay repeater 8b is physically mounted where the ICU 9 was positioned when the transmit routine was performed.

The next step in the low level stage of configuration is where the ICU 9 performs a low level configuration of the first relay repeater 8b. From task block 942, the method proceeds to task block 944 whereby the first relay repeater 8b is switched into a configuration mode by the operator. Once the first relay repeater is placed in a configuration mode, the preferred method moves to task block 946 whereby setup configuration parameters are downloaded to the first relay repeater 8b by the ICU 9 via either wireless communications or by a direct connection. The next step in the low level configuration of the present invention, depicted in task block 948, is to prompt the first relay repeater 8b to perform a periodic transmit routine that sends a transmission strength test signal to the first machine monitor 4a at different transmission power levels. The ICU 9 then prompts the first machine monitor 4a to initiate a receive routine that receives the transmission strength test signal from the first relay repeater 8b and calculates the BER for each power level of the transmission strength test signal. The machine monitor 4a preferably has software that allows it to calculate the BER. In task block 950, the first machine monitor 4a informs the ICU 9 of the minimum transmit power level of the first relay repeater 8b with an acceptable BER. However, as previously discussed, if the repeater 8b is continuously powered, its power consumption is relatively unimportant and its transmission level can be set at the highest possible level. If the repeater's 8b transmission level is set to its highest level, it is unnecessary to perform the steps of the method used to determine the transmission level of the repeater 8b.

The method then moves to decision block 954, where the ICU 9 prompts the first machine monitor 4a to perform a periodic transmit routine that sends a transmission strength test signal to the first relay repeater 8b at different transmission power levels. The ICU 9 also prompts the first relay repeater 8b to initiate a receive routine that receives the transmission strength test signal from the first machine monitor 4a and calculates the BER for each power level of the transmission strength test signal. In task block 956, the first relay repeater 8b informs the ICU 9 of the minimum transmit power level of the first machine monitor 4a with an acceptable BER. The method moves to task block 960 whereby the ICU 9 informs the operator of the minimum transmission strength signals for both the first machine monitor 4a and the first relay repeater 8b with an acceptable BER. In task block 960, the ICU 9 sends these transmission signal strength configurations to both the first machine monitor 4a and the first relay repeater 8b. The method then moves to task block 962 whereby the operator is prompted to record the serial numbers of the first machine monitor 4a and the first relay repeater 8b in the chain 930, along with their logical locations in the chain 930. These numbers and locations are recorded in the memory of the ICU 9 for subsequent downloading to the command station 6. The operator is also instructed to record the serial numbers and physical locations of the first machine monitor 4a and first relay repeater 8b on a plant layout drawing of the industrial setting. It is understood, however, that the serial numbers, physical locations, and logical locations could also be stored directly in the associated relay repeater or machine monitor.

Figure 13:
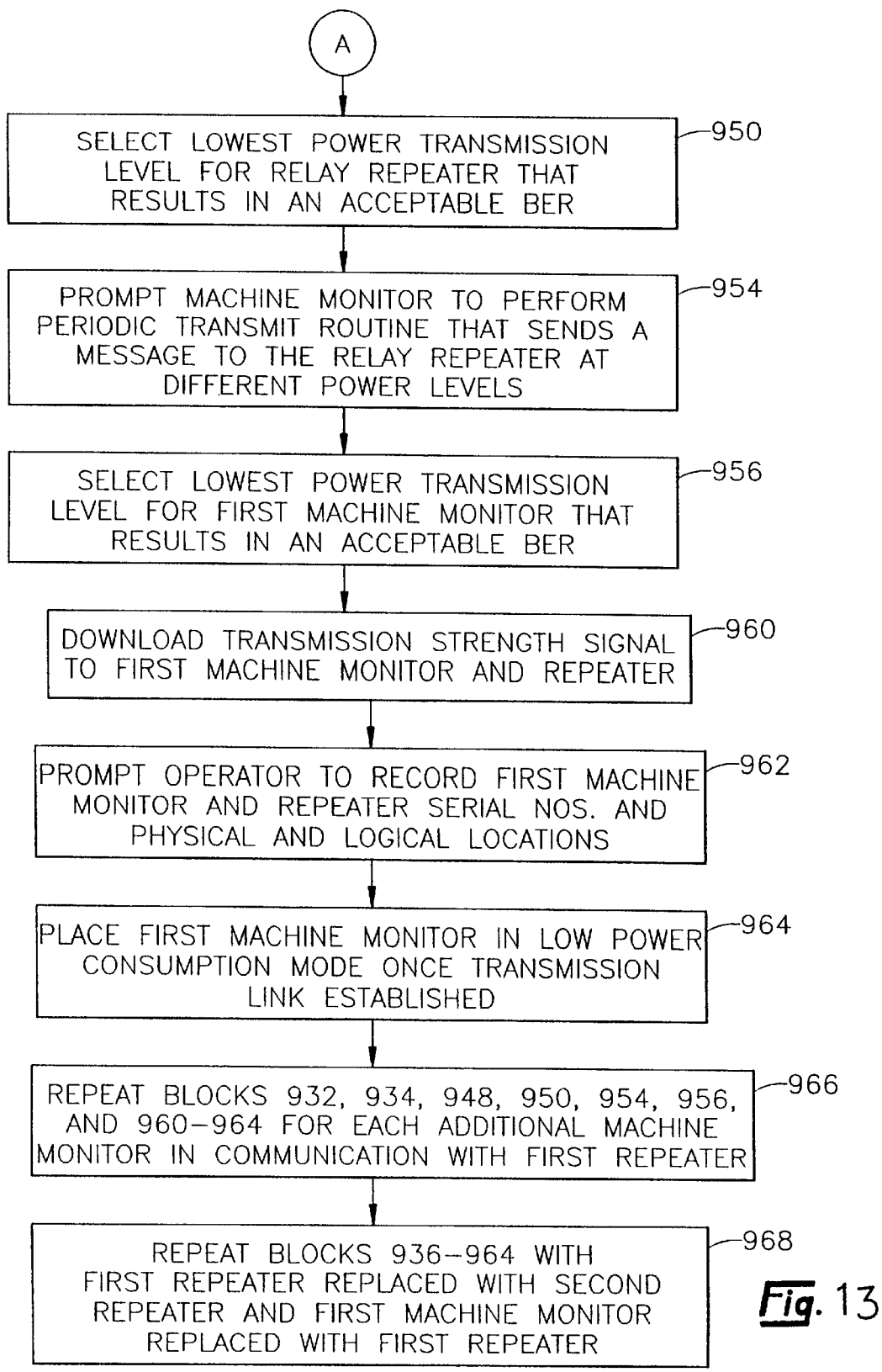
FIG. 13 is the second portion of a flow chart of a method for configuring a wireless machine monitoring system.

As shown in FIG. 13, the method next moves to task block 964 whereby the first machine monitor 4a is placed in a low power consumption mode, such as a wait state, once a transmission and reception link has been established between the first relay repeater 8b and the first motor monitor 4a. The method next moves to task block 966 whereby blocks 932, 934, 948, 950, 954, 956 and 960–964 are repeated for each additional machine monitor that is in communication with the first relay repeater 8b in the chain 930.

It is to be understood that more than one scheme for configuring the transmission power levels of the repeaters, such as 8b, and machine monitor, such as 4a, is covered by the present invention. For example, in the embodiment described above, the first relay repeater 8b utilizes a different transmission power level for each machine monitor 4a it is in communication with. This conserves repeater 8b power by insuring that the transmission level is never higher than it needs to be to facilitate communication. However, it should be understood that the transmission power level of the repeater 8b could also be set at the transmission level corresponding to the highest of the minimum levels calculated for the machine monitors 4a, 4b or 4c in communication with the repeater 8b. This would not conserve power as efficiently as the aforementioned method, but it would also not require that the repeater 8b vary its transmission level according to which particular machine monitor 4a, 4b or 4c was communicating with the repeater 8b. Furthermore, if the repeater 8b is continuously powered, the repeater 8b can simply be set to transmit at its highest possible transmission level.

The method then moves to task block 968 whereby blocks 936–964 are repeated with the first relay repeater 8b replaced with a second relay repeater 8c and the first machine monitor 4a replaced with the first relay repeater 8b. It is understood, that these low level stages of configuration will be repeated for each element of each chain in the present wireless machine monitoring system 995.

A second stage of installation of the present wireless machine monitoring system 995 involves synchronizing the machine monitors 4a, 4b and 4c and relay repeaters 8b and 8c in the chain 930 for proper communication within a time slice schedule. In the current wireless machine monitoring system 995, only one device is transmitting data and one device ig receiving data at any one time, this is why the time slice schedule is needed. In this stage, the operator must begin at the master repeater 8m and move "down" the chain 930 toward the machine monitors 4a, 4b and 4c because all clocks contained within elements of the chain are referenced to the clock of the master repeater 8m and will be maintained by the master repeater 8m. Once this stage has been completed, the operator can either configure and install the next chain in the wireless machine monitoring system 995 or begin normal system operation.

The second phase of the communications cycle of the present invention is a poll phase whereby the command station 6 transmits signals to each machine monitor 4a, 4b and 4c to request data such as whether the machine monitors 4a, 4b and 4c are operating under a non-error condition, whether the temperature sensors of the machine monitors 4a, 4b and 4c are in proper range, whether vibration data is within a proper spectrum range, or whether sufficient battery life remains in the machine monitors 4a, 4b and 4c. The most important requirement of the poll phase, however, is to ensure that all clocks within the chain 930 are synchronized to the clock of the master repeater 8m. During operation of the present system 995, it is preferred that once minute every machine monitor 4a, 4b or 4c in the system 995 activate its receiver and listen for polling messages to be sent from the command station 6, and then respond thereto.

Figure 14:
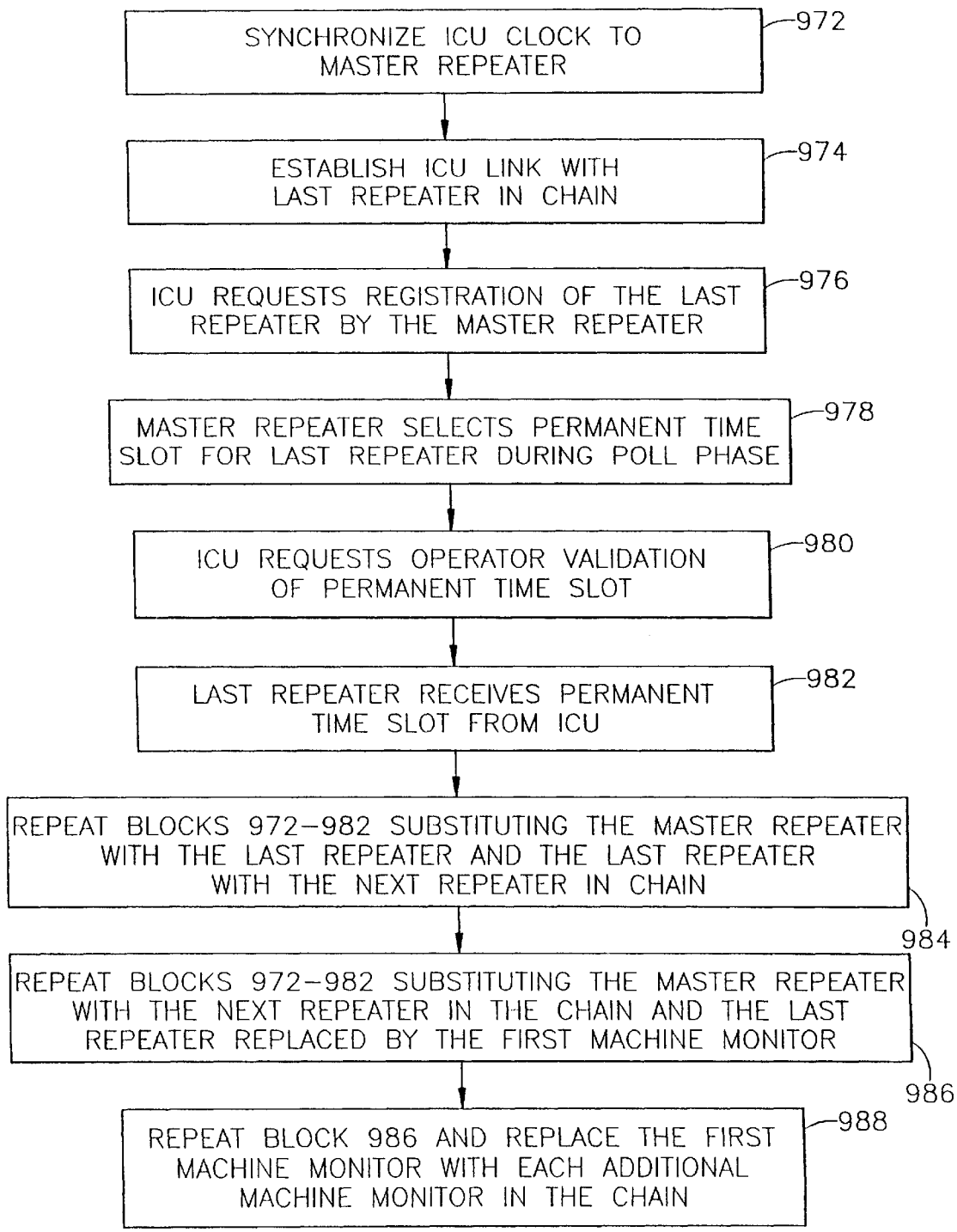
FIG. 14 is a flow chart of a method for synchronizing a wireless machine monitoring system.

Step one of the chain synchronization of the present system 995 is when the ICU 9 registers with the master repeater 8m, as shown in task block 972 of FIG. 14. This occurs at the time slot allocated to the ICU 9 during the poll phase of the communications cycle. During this step, the ICU 9 synchronizes its clock to the clock of the master repeater 8m. Step two of the chain synchronization is when the ICU 9 establishes a wireless communications link with the second relay repeater 8c. The method moves to task block 974 whereby, after the poll phase of the communication cycle, the ICU 9 establishes a communications link with the second relay repeater 8c, which is currently in a standby/low power consumption mode. The time slice at which this link occurs is used by the second relay repeater 8m as its temporary time slot in which to communicate. Step three in the chain synchronization is for the ICU 9 to register the second relay repeater 8c with the master repeater 8m, which occurs in task block 976 of the present method. The method then moves to task block 978 whereby the master repeater 8m selects a permanent time slice for the last repeater in the chain 930, which in FIG. 11 is the second relay repeater 8c.

The fourth step in the chain synchronization is for the last repeater 8c in the chain 930, or the second relay repeater 8c, to be configured with a permanent time slice. First, the master repeater 8m notifies the ICU 9 of the permanent time slice available for the second relay repeater 8c. The method then moves to task block 980 whereby the ICU 9 request operator validation of the permanent time slice. The method then moves to task block 982 whereby, during the temporary time slice allocated to the second relay repeater 8c, the ICU 9 sends to the second relay repeater 8e its permanent time slice within the time schedule. The second relay repeater 8c will then abandon the temporary time slice and begin using its permanent time slice.

The next step in the chain synchronization is to follow the above steps for each subsequent relay repeater in the chain 930. When repeating the above steps, the next repeater in the chain is substituted for the master repeater 8m, which in this situation would be the second relay repeater 8c. The second relay repeater 8c in the above steps is substituted for the next repeater in the chain 930. These substitutions occur in test block 984.

The method then moves to task block 986 whereby the above steps or blocks are repeated by substituting the repeater 8b closest to the machine monitors 4a, 4b and 4c in the chain 930 for the master repeater 8m and replacing the last repeater with the first machine monitor 4a. The method then moves to task block 988 whereby the last task block 986 is repeated with the first machine monitor 4a being replaced with each additional machine monitor, such as 4b, in the chain 930. Once the configuration and synchronization of the present wireless machine monitoring system 995 is complete, the high level stage of the configuration can occur. This includes such tasks as setting the temperature and frequency ranges of the machine monitors of each chain 930.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A method for configuring a wireless machine monitoring system having at least one chain of a plurality of programmable transceiver devices including a machine monitor, a relay repeater and an Installation and Configuration Unit ("ICU"), the method comprising he steps of:
   (a) positioning the ICU in a physical location within wireless communications range of a first transceiver device and receiving data transmitted by the first transceiver device with the ICU;
   (b) calculating a test bit error rate for test data transmitted from the first transceiver device to the ICU;
   (c) comparing the test bit error rate to an acceptable bit error rate to determine whether the test bit error rate is acceptable; and
   (d) mounting a second transceiver device where the ICU is positioned if it is determined that the test bit error rate is acceptable.

2. The method of claim 1 further comprising:
   (e) determining a minimum transmit power level for the first transceiver device that results in a test bit error rate equal to or less than the acceptable bit error rate for data transmitted from the first transceiver device and received by the second transceiver device; and
   (f) configuring the first transceiver device to communicate at the minimum transmit power level.

3. The method of claim 1 further comprising the step of the ICU requesting a user to record the serial numbers and the logical locations of the first and second transceiver devices.

4. The method of claim 1 further comprising the step of the ICU prompting a user to record physical locations of the first and second transceiver devices.

5. The method of claim 1 where in the step of positioning the ICU further comprises the step of repositioning the ICU until it is determined that the ICU is positioned such that the bit error rate is acceptable for wireless communications between first and second transceiver devices.

6. The method of claim 1 further comprising the step of downloading configuration parameters to the first and second transceiver devices.

7. The method of claim 1 further comprising the step of placing the first and second transceiver devices in a low power consumption mode once wireless communication is established between the first and second transceiver devices.

8. The method of claim 1 further comprising:
   (e) determining a minimum transmit power level for the first transceiver device that results in a bit error rate equal to or less than the acceptable bit error rate for data transmitted from the first transceiver device and received by the second transceiver device; and
   (f) configuring the first transceiver device to communicate at the minimum transmit power level;
   (g) determining a second minimum transmit power level for the second tansceiver device for data transmitted from the second to the first transceiver device; and
   (h) configuring the second transceiver device to communicate at the second minimum transmit power level.

9. The method of claim 1 further comprising:
   (e) determining a minimum transmit power level for the first transceiver device that results in a bit error rate equal to or less than the acceptable bit error rate for data transmitted from the first transceiver device and received by the second transceiver device; and
   (f) configuring the first transceiver device to communicate at the minimum transmit power level;
   (g) determining a second minimum transmit power level for the second transceiver device for data transmitted from the second to the first transceiver device; and
   (h) positioning the ICU in a second physical location within wireless communication range of the second transceiver device and receiving data transmitted by the second transceiver device;
   (I) performing a bit error rate calculation on data transmitted from the second transceiver device to the ICU to thereby determine a test bit error rate;
   (j) comparing the test bit error rate to an acceptable bit error rate and thereby determining whether the test bit error rate is acceptable;
   (k) mounting a third transceiver device at the second physical location if it is determined that the bit error rate is acceptable;
   (l) determining a third minimum transmit power level for the third transceiver device that results in a bit error rate equal to or less than the acceptable bit error rate for data transmitted from the third transceiver device to the second transceiver device;
   (m) configuring the third transceiver device to communicate at the third minimum transceiver power level;

(n) determining a fourth minimum transmission power level for the second transceiver device that results in a bit error rate equal to or less than the acceptable bit error rate for data transmitted from the second transceiver device to the third transceiver device; and (o) configuring the second transceiver device to communicate at a power level based in part on the second and fourth minimum power levels.

10. The method of claim 9 wherein step (o) further comprises configuring the second transceiver device to communicate at the greater of the second and fourth minimum power levels.

11. The method of claim 9 wherein step (o) further comprises configuring the second transceiver device to transmit at the second minimum power level when communicating with the first transceiver device and to transmit at the fourth minimum power level when communicating with the third transceiver device.

12. A method for configuring a wireless machine monitoring system having at least one chain of programmable transceiver devices including a machine monitor and a relay repeater, a master repeater in communication with the at least one chain, a command station in communication with the master repeater, an Installation and Configuration Unit ("ICU"), and a clock contained in each transceiver device, the method comprising the steps of:

(a) synchronizing the clock of the ICU with the clock of a first transceiver device;

(b) establishing wireless ICU transmit and receive communication with the first transceiver device;

(c) determining a permanent time slot under which the first transceiver will communicate; and (d) communicating commands from the ICU to a second transceiver device and thereby configuring the second transceiver device to communicate with the first transceiver device during the permanent time slot and to synchronize the clocks of the first and second transceiver devices.

13. The method of claim 12 further comprising the step of the ICU requesting registration of the second transceiver device by the first transceiver device whereby the first transceiver device is programmed to communicate with the second transceiver device during the permanent time slot.

14. The method of claim 12 further comprising the step of the ICU requesting operator validation of the permanent time slot for the second transceiver device.

15. The method of claim 12 further comprising using a master repeater as the first transceiver device and using a relay repeater as the second transceiver device.

16. The method of claim 12 further comprising using first and second relay repeaters as the first and second transceiver devices.

17. The method of claim 16 further comprising using a machine monitor as the second transceiver device and using a relay repeater or master repeater as the first transceiver device.

18. A method for configuring and synchronizing a wireless machine monitoring system having at least one chain including a machine monitor and a relay repeater, a master repeater in communication with the at least one chain, a command station in communication with the master repeater, and an Installation and Configuration Unit ("ICU"), a clock contained in each machine monitor, relay repeater, master repeater and ICU the method comprising the steps of configuring the wireless machine monitoring system by:

(a) downloading configuration parameters to the machine monitor and the relay repeater from the ICU;

(b) positioning the ICU within wireless communications range of the machine monitor and establishing wireless communication between the ICU and machine monitor;

(c) determining an acceptable bit error rate for communications between the machine monitor and the relay repeater;

(d) performing a bit error rate calculation on data transmitted by the machine monitor to the ICU;

(e) determining whether the ICU is positioned such that the bit error rate is acceptable for wireless communications between the machine monitor and the relay repeater;

(f) repositioning the ICU within wireless communications range of the machine monitor and repeating steps (d) and (e), if it is determined that the bit error rate is unacceptable for wireless communications between the machine monitor and the relay repeater, (g) mounting the relay repeater at a first location where the ICU is positioned if it is determined that the bit error rate is acceptable for wireless communications between the machine monitor and the relay repeater and downloading configuration parameters to the relay repeater;

(h) determining a minimum transmit power level for the machine monitor based on the acceptable bit error rate;

(i) sending a transmission strength signal configuration message from the ICU to the machine monitor and thereby configuring the machine monitor to transmit at the minimum transmit power level for the machine monitor;

(j) prompting by the ICU for recordation of serial numbers for the machine monitor and the relay repeater, and logical locations of the machine monitor and the relay repeater in the chain;

(k) prompting by the ICU for recordation of the physical locations of the machine monitor and the relay repeater indicative of where the machine monitor and relay repeater are physically located;

(l) synchronizing the wireless machine monitoring system by synchronizing the clocks of the machine monitor, the relay repeater, and the ICU;

(m) establishing wireless ICU transmit and receive communication with the relay repeater;

(n) transmitting signals with the ICU for requesting registration by the relay repeater of the machine monitor;

(o) selecting a permanent time slot under which the relay repeater communicates with the machine monitor;

(p) requesting operator validation of the permanent time slot under which the relay repeater and machine monitor are operational; and (q) transmitting from the ICU to the relay repeater and the machine monitor a configuration signal and thereby configuring the relay repeater and machine monitor to operate during the selected permanent time slot.

19. The method of claim 18 further comprising providing additional machine monitors within the communication range of the relay repeater for communicating with the relay repeater and for each additional machine monitor configuring a minimum transmit power level by repeating (g)–(i) for each additional machine monitor.

20. The method of claim 18 wherein each additional machine monitor and the relay repeater are synchronized and configured by repeating steps (l)–(q) for each additional machine monitor, thereby configuring each machine monitor to operate during different permanent time slots and configuring the relay repeater to operate during all of the different permanent time slots.

21. The method of claim 18 wherein steps (a)–(l) are repeated for each additional chain in the wireless machine monitoring system.

22. The method of claim 18 wherein steps (m)–(r) are repeated while substituting the master repeater with the relay repeater and the relay repeater with another relay repeater in closer proximity to the machine monitor than the master repeater.

23. A method of configuring a wireless machine monitoring system comprising performing a bit error rate calculation on test data transmitted by a repeater to a machine monitor, determining a minimum transmit power level that produces an acceptable bit error rate at the machine monitor, and configuring the repeater to transmit at the minimum power level producing an acceptable bit error rate.

24. The method of claim 18 further comprising performing a plurality of bit error rate calculations on a plurality of test data transmitted by the relay repeater to a plurality of machine monitors, determining a plurality of minimum power levels, each minimum power level corresponding to an acceptable bit error rate at one of the machine monitors, and configuring the relay repeater to transmit at one or more power levels based on the plurality of minimum power levels.

25. The method of claim 18 further comprising performing a plurality of bit error rate calculations on a plurality of test data transmitted by the relay repeater to a master repeater and one or more machine monitors, determining a plurality of minimum power levels, each minimum power level corresponding to an acceptable bit error rate at the master repeater or one or more machine monitors, configuring the relay repeater to transmit at one or more power levels based on the plurality of minimum power levels.

26. The method of claim 18 further comprising performing a bit error rate calculation on test data transmitted by a master repeater to the relay repeater, determining the minimum power level that produces an acceptable bit error rate at the relay repeater, and configuring the master repeater to transmit at the minimum power level producing the acceptable bit error rate.

27. A method of installing a wireless machine monitoring system having at least a machine monitor and a command station, the method comprising the steps of:
 (a) prompting the machine monitor to transmit a known set of data to the command station at a transmission power level;
 (b) receiving the data at the command station;
 (c) determining an accuracy with which the machine monitor transmitted the data; and
 (d) adjusting the transmission power level of the machine monitor in response to the accuracy.

28. A method of minimizing power usage of wireless machine monitors that are in communication with a command station, the method comprising the steps of:
 (a) configuring the machine monitors to transmit data at a lowest possible power level that allows for reasonably accurate data transmission; and
 (b) configuring the machine monitors to only transmit or receive data intermittently.

29. An installation control unit for installing and configuring a wireless machine monitoring system comprising:
 (a) a transmitter for sending configuration parameters to the machine monitoring system,
 (b) a receiver for receiving data from the machine monitoring system,
 (c) processing means for analyzing and storing data received from the machine monitoring system, said processing means including:
  (1) means for determining a signal strength of a transmitted signal,
  (2) means for assigning a machine monitor to a repeater,
  (3) means for placing a machine monitor or a repeater in a configuration mode, and
  (4) means for assigning a machine monitor a time slice during which to communicate, and
 (d) clock means for synchronizing the operation of the machine monitoring system.

30. The installation control unit of claim 29 further comprising a display for displaying status information and a keyboard for allowing a user to input information.

* * * * *